(12) United States Patent
Nakamura et al.

(10) Patent No.: US 11,474,854 B2
(45) Date of Patent: Oct. 18, 2022

(54) TRANSFORMATION OF INTER-ORGANIZATION PROCESS FOR EXECUTION VIA BLOCKCHAIN

(71) Applicant: International Business Machines Corporation, Armonk, NY (US)

(72) Inventors: Hiroaki Nakamura, Tokyo (JP);
Michiharu Kudo, Kamakura (JP);
Kohtaroh Miyamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 16/174,766

(22) Filed: Oct. 30, 2018

(65) Prior Publication Data
US 2020/0133716 A1    Apr. 30, 2020

(51) Int. Cl.
*G06F 16/18* (2019.01)
*G06F 16/182* (2019.01)
*G06F 9/48* (2006.01)

(52) U.S. Cl.
CPC ........ *G06F 9/4843* (2013.01); *G06F 16/1805* (2019.01); *G06F 16/1837* (2019.01); *G06F 16/1865* (2019.01)

(58) Field of Classification Search
CPC .............. G06F 9/4843; G06F 16/1865; G06F 16/1837; G06F 16/1805; G06Q 10/103; G06Q 10/0631; H04L 63/10; H04L 2209/38; H04L 9/3239
See application file for complete search history.

(56) References Cited

U.S. PATENT DOCUMENTS

| | | | | |
|---|---|---|---|---|
| 4,992,978 A * | 2/1991 | Thornton | ................... | G06F 8/45 718/107 |
| 10,158,479 B2 * | 12/2018 | Chapman | ................ | G06F 9/451 |
| 10,394,720 B2 * | 8/2019 | Ganti | ..................... | H04L 9/3236 |
| 10,445,698 B2 * | 10/2019 | Hunn | ....................... | G06F 16/93 |
| 10,803,451 B2 * | 10/2020 | Peikert | ............... | G06Q 20/1235 |
| 2008/0249646 A1 * | 10/2008 | Alse | ................... | G06Q 30/0201 700/104 |
| 2009/0299810 A1 * | 12/2009 | Jardine | ............. | G06Q 10/1093 705/7.18 |
| 2017/0109668 A1 | 4/2017 | Marcu et al. | | |

(Continued)

OTHER PUBLICATIONS

Fridgen, Gilbert, Cross-Organizational Workflow Management Using Blockchain Technology-Towards Applicability, Auditability and Automation, Hawaiian International Conference on System Sciences, 2018.

(Continued)

*Primary Examiner* — Pierre M Vital
*Assistant Examiner* — Zuheir A Mheir

(57) ABSTRACT

An example operation may include one or more of storing chaincode comprising executable steps of a multi-party process generated from a state diagram in which a blockchain is an intermediary between a plurality of off-chain systems, receiving a request to execute the multi-party process, processing a step of the multi-party process based on the request via execution of the stored chaincode including the executable steps of the multi-party process to generate a processed result for the step, and storing an identification of the processed step and the generated processed result via a data block among a hash-linked chain of data blocks of the blockchain.

18 Claims, 24 Drawing Sheets

(56) References Cited

U.S. PATENT DOCUMENTS

| | | |
|---|---|---|
| 2018/0005186 A1* | 1/2018 | Hunn .................... G06F 40/103 |
| 2018/0039667 A1 | 2/2018 | Pierce et al. |
| 2018/0096347 A1 | 4/2018 | Goeringer et al. |
| 2018/0129955 A1* | 5/2018 | Saxena ................. H04L 9/3236 |
| 2018/0137306 A1 | 5/2018 | Brady et al. |
| 2018/0150835 A1* | 5/2018 | Hunt ....................... H04L 67/10 |
| 2018/0152289 A1* | 5/2018 | Hunt .................... G06Q 20/223 |
| 2018/0158034 A1 | 6/2018 | Hunt et al. |
| 2018/0173719 A1 | 6/2018 | Bastide et al. |
| 2018/0218176 A1* | 8/2018 | Voorhees ............... H04L 9/3213 |
| 2018/0225448 A1 | 8/2018 | Russinovich et al. |
| 2018/0225661 A1 | 8/2018 | Russinovich et al. |
| 2018/0276666 A1* | 9/2018 | Haldenby ............. G06Q 20/20 |
| 2018/0328612 A1 | 11/2018 | Sinha et al. |
| 2018/0342036 A1 | 11/2018 | Zachary |
| 2019/0018984 A1* | 1/2019 | Setty ....................... H04L 63/14 |
| 2019/0026821 A1 | 1/2019 | Bathen et al. |
| 2019/0050855 A1* | 2/2019 | Martino ............. G06Q 20/3829 |
| 2019/0074962 A1* | 3/2019 | Ateniese ............... H04L 63/061 |
| 2019/0087446 A1* | 3/2019 | Sharma ................ G06Q 20/382 |
| 2019/0149321 A1 | 5/2019 | Androulaki et al. |
| 2019/0279197 A1* | 9/2019 | Wright .................. H04L 9/0637 |
| 2019/0392392 A1* | 12/2019 | Elden ................. G06Q 10/0633 |
| 2020/0125661 A1 | 4/2020 | Albright et al. |
| 2020/0145191 A1* | 5/2020 | Qi ......................... H04W 4/021 |
| 2020/0327498 A1* | 10/2020 | Weber ....................... G06F 8/36 |

OTHER PUBLICATIONS

Garcia-Banuelos, Luciano, Optimized Execution of Business Processes on Blockchain, Etherum, Apr. 2, 2017.

Wendling, Jan et al., Blockchains for Business Process Management Challenges and Opportunities, ACM Transactions on Management Systems Jul. 4, 2017.

Nakamura, Inter-Organizational Business Processes Managed by Blockchain, IBM Research Tokyo.

Ateniese et al., "Redactable Blockchain—or—Rewriting History in Bitcoin and Friends," IEEE, 2017, 16pg. (Year: 2017).

Gabison, Garry, "Policy Considerations for the Blockchain Technology Public and Private Applications," SMU Science and Technology Law Review, 2016, 24pg. (Year: 2016).

Xu et al., "The Blockchain as a Software Connector," IEEE, 2016, 10pg. (Year: 2016).

* cited by examiner

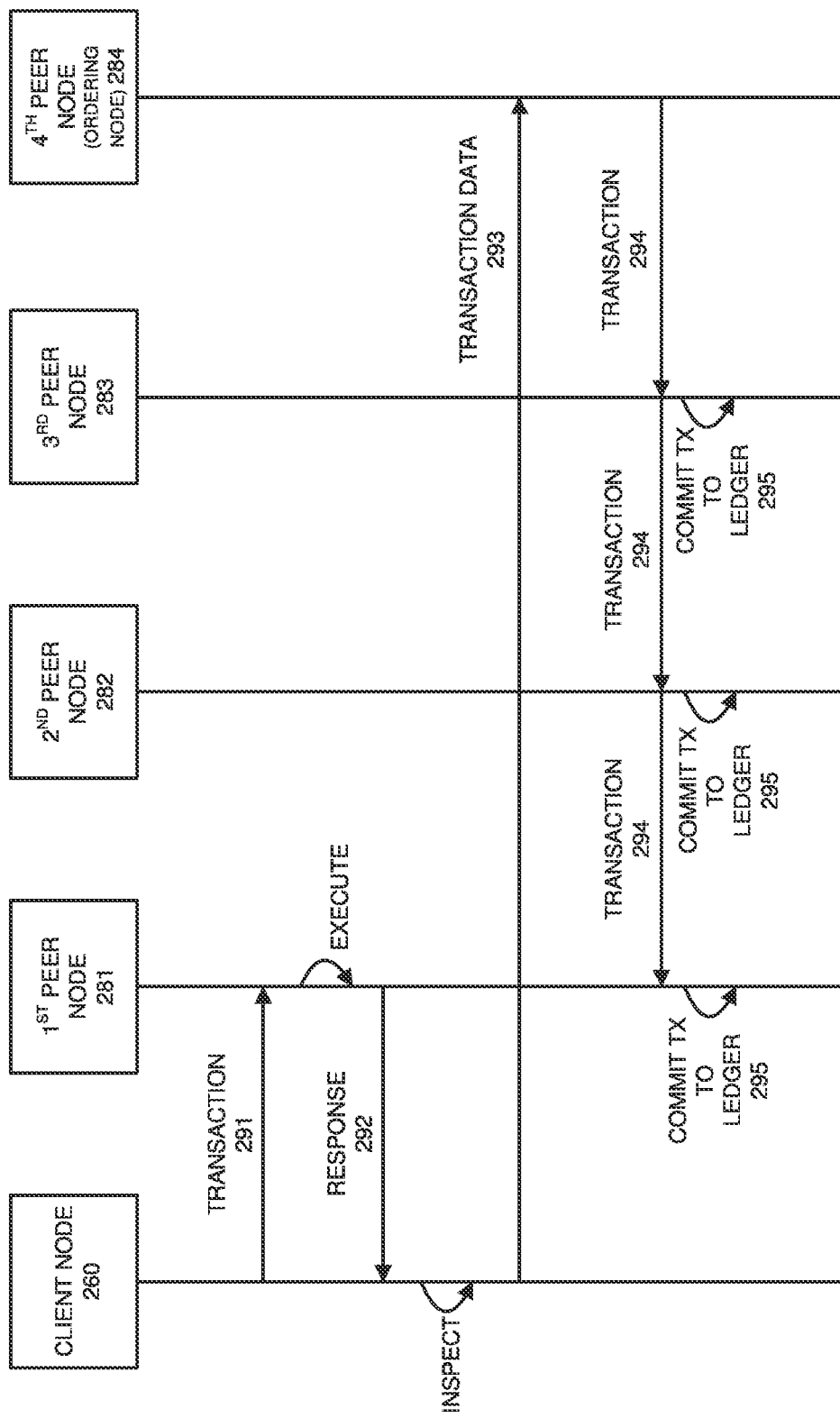

Statechart for Blockchain

410A

420A

Statechart for Insurer

430A

Reduced Statechart for Client

Reduced Statechart for Insurer

Reduced Statechart for Surveyor

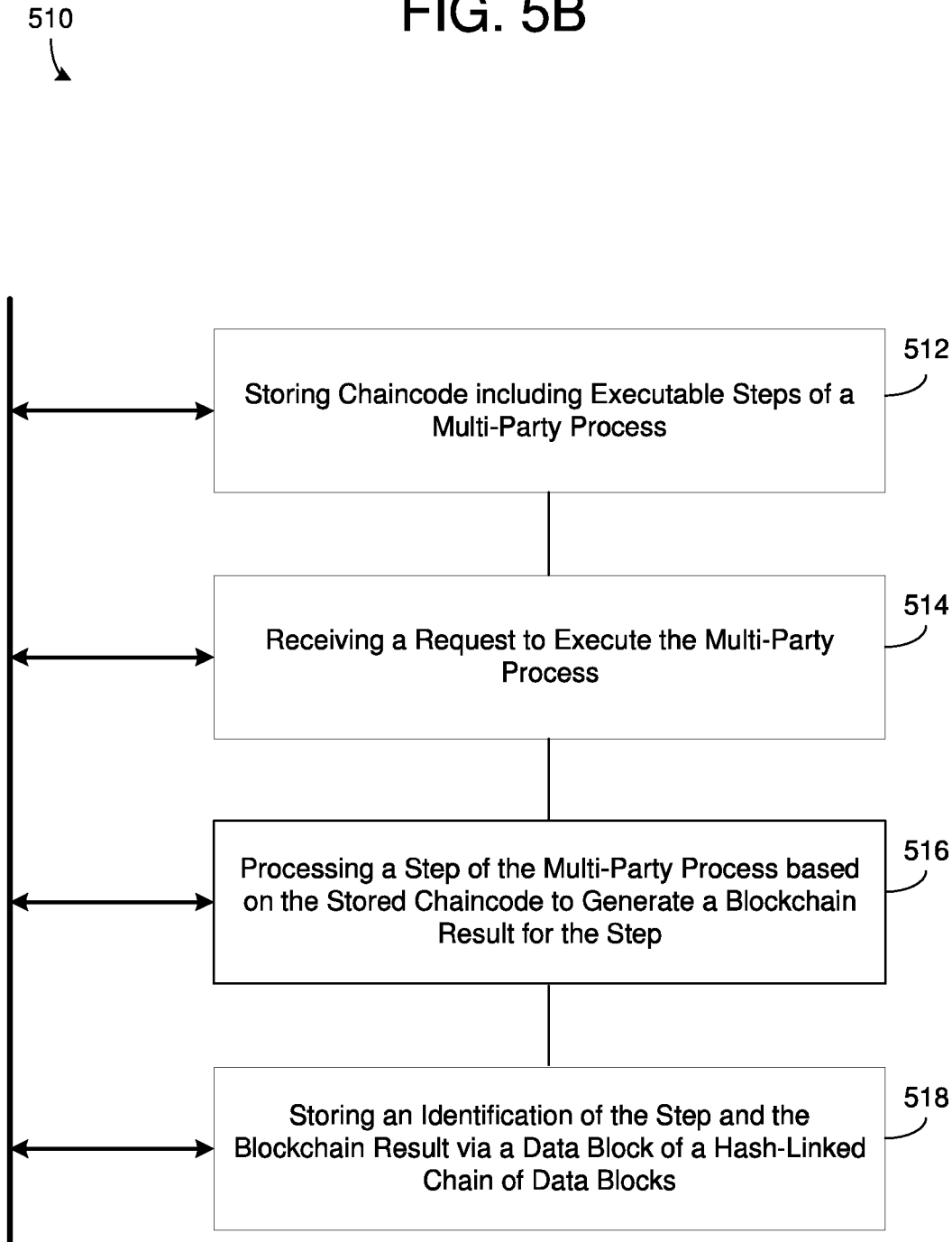

600

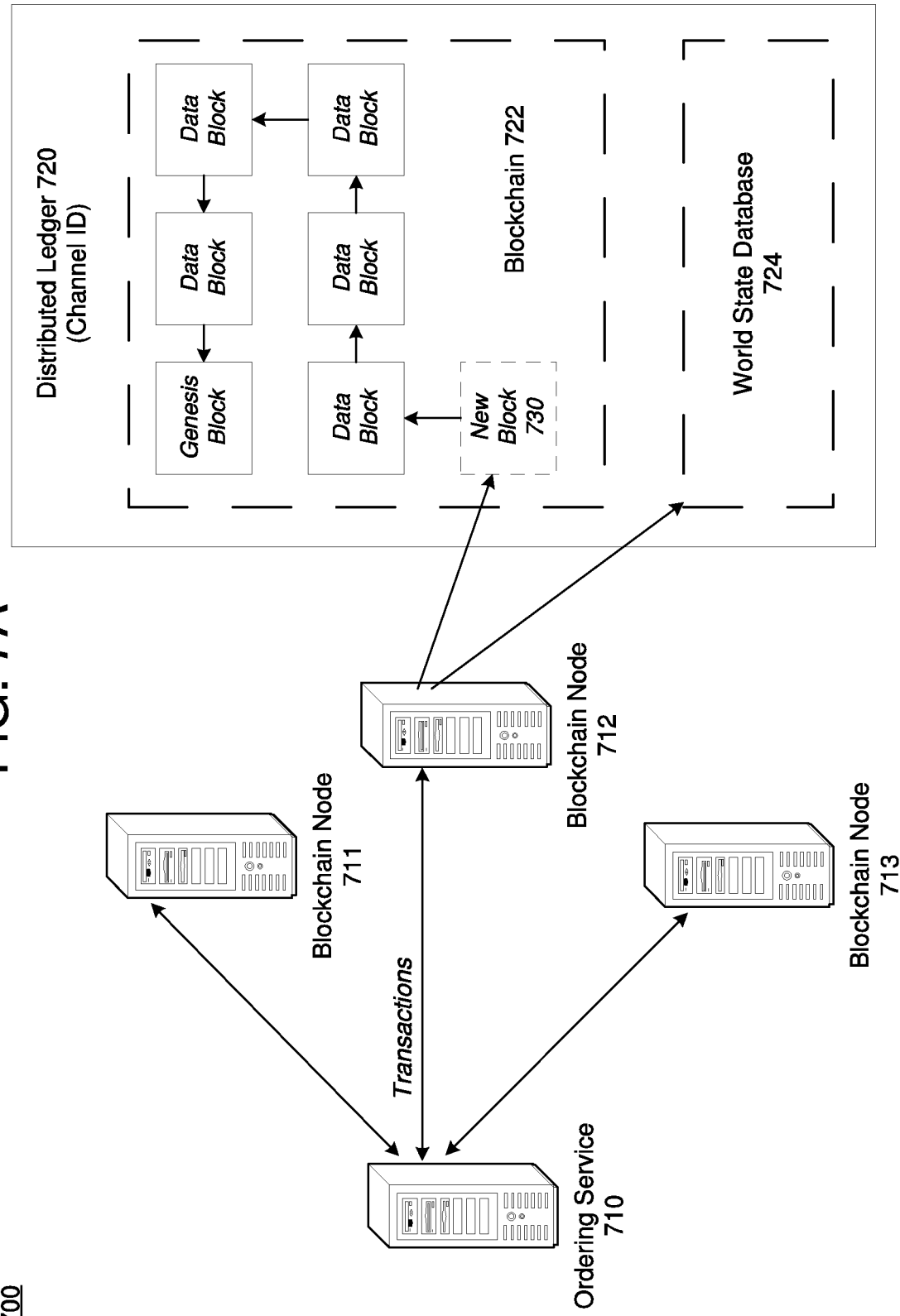

TRANSFORMATION OF INTER-ORGANIZATION PROCESS FOR EXECUTION VIA BLOCKCHAIN

TECHNICAL FIELD

This application generally relates to a process performed via a blockchain, and more particularly, to a system which transforms a multi-organization process involving a blockchain as an intermediary into a plurality of state diagrams and executes the multi-organization process via the blockchain based on the plurality of state diagrams.

BACKGROUND

A centralized database stores and maintains data at one location. This location is often a central computing system such as a server or a mainframe computer. Information stored on a centralized database is typically accessible from multiple different points. For example, multiple users or client workstations can work simultaneously on the centralized database based on a client/server configuration. Because of its single location, a centralized database is easy to manage, maintain, and control, especially for purposes of security. Within a centralized database, data integrity is maximized and data redundancy is minimized as a single storing place of all data also implies that a given set of data only has one primary record. This aids in the maintaining of data as accurate and as consistent as possible and enhances data reliability.

However, a centralized database suffers from significant drawbacks. For example, a centralized database has a single point of failure. In particular, if there is no fault-tolerance setup and a hardware failure occurs, all data within the database is lost and work of all users is interrupted. In addition, a centralized database is highly dependent on network connectivity. As a result, the slower the Internet connection, the longer the amount of time needed for each database access. Another drawback is that bottlenecks can occur when the centralized database experiences high traffic. Furthermore, the centralized database provides limited access to data because only one active/productive copy of the data is maintained. As a result, multiple users may not be able to access the same piece of data at the same time without creating problems such as overwriting necessary data. Furthermore, because a central database has minimal to no data redundancy, if a set of data is unexpectedly lost can be difficult to retrieve other than through manual operation from back-up disk storage.

Recently, organizations have begun collaborating via a blockchain to carry out multi-organizational processes. However, these processes are often carried out inefficiently requiring redundant transmissions, receptions, storage, and the like, between the blockchain and the participating organizations. Accordingly, a mechanism is needed for efficiently implementing inter-organization processes via a blockchain.

SUMMARY

One example embodiment may provide a system that includes one or more of a storage device, a network interface configured to receive a plurality of state representations of a plurality of off-chain systems for a multi-party process via a blockchain, wherein each state representation identifies send and receive events of a respective off-chain system, and a processor configured to one or more of remove one or more events from a state representation of an off-chain system to generate a reduced state representation, generate executable chaincode for the blockchain based on the plurality of state representations which include the reduced state representation, and store the generated chaincode via the storage.

Another example embodiment may provide a method that includes one or more of receiving a plurality of state representations of a plurality of off-chain systems for performing a multi-party process via a blockchain, wherein each state representation identifies send and receive events of a respective off-chain system, removing one or more events from a state representation of an off-chain system to generate a reduced state representation, generating executable chaincode for the blockchain based on the plurality of state representations including the reduced state representation, and storing the generated chaincode via a blockchain node of the blockchain.

Another example embodiment may provide a non-transitory computer readable medium comprising instructions, that when read by a processor, cause the processor to perform one or more of receiving a plurality of state representations of a plurality of off-chain systems for performing a multi-party process via a blockchain, wherein each state representation identifies send and receive events of a respective off-chain system, removing one or more events from a state representation of an off-chain system to generate a reduced state representation, generating executable chaincode for the blockchain based on the plurality of state representations including the reduced state representation, and storing the generated chaincode via a blockchain node of the blockchain.

Another example embodiment may provide a system that includes one or more of a storage configured to store chaincode which comprises executable steps of a multi-party process generated from a state diagram in which a blockchain is an intermediary between a plurality of off-chain systems, a network interface configured to receive a request to execute the multi-party process, and a processor configured to one or more of process a step of the multi-party process based on the request via execution of the stored chaincode which includes the executable steps of the multi-party process to generate a processed result for the step, and store an identification of the processed step and the generated processed result via a data block among a hash-linked chain of data blocks of the blockchain.

Another example embodiment may provide a method that includes one or more of storing chaincode comprising executable steps of a multi-party process generated from a state diagram in which a blockchain is an intermediary between a plurality of off-chain systems, receiving a request to execute the multi-party process, processing a step of the multi-party process based on the request via execution of the stored chaincode including the executable steps of the multi-party process to generate a processed result for the step, and storing an identification of the processed step and the generated processed result via a data block among a hash-linked chain of data blocks of the blockchain.

A further example embodiment may provide a non-transitory computer readable medium comprising instructions, that when read by a processor, cause the processor to perform one or more of storing chaincode comprising executable steps of a multi-party process generated from a state diagram in which a blockchain is an intermediary between a plurality of off-chain systems, receiving a request to execute the multi-party process, processing a step of the multi-party process based on the request via execution of the stored chaincode including the executable steps of the multi-party process to generate a processed result for the step, and storing an identification of the processed step and the generated processed result via a data block among a hash-linked chain of data blocks of the blockchain.

BRIEF DESCRIPTION OF THE DRAWINGS

FIG. 2B is a diagram illustrating a peer node blockchain configuration, according to example embodiments.

FIG. 5B is a diagram illustrating a method of executing a multi-organizational process via a blockchain according to example embodiments.

FIG. 7A is a diagram illustrating a process of a new block being added to a blockchain ledger, according to example embodiments.

DETAILED DESCRIPTION

Figure 1A:
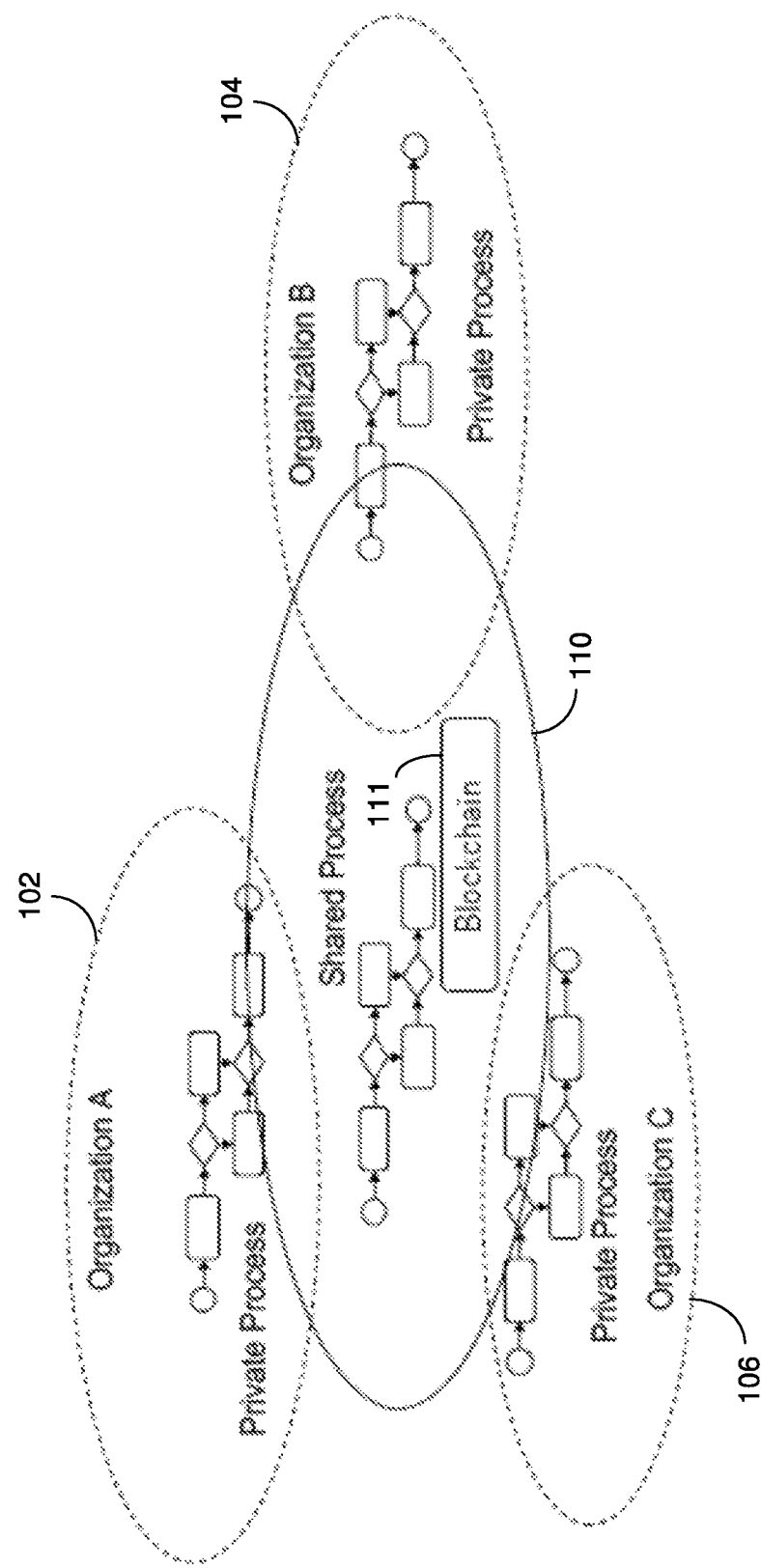
FIG. 1A is a diagram illustrating of a shared processing environment with a blockchain as an intermediary according to example embodiments.

It will be readily understood that the instant components, as generally described and illustrated in the figures herein, may be arranged and designed in a wide variety of different configurations. Thus, the following detailed description of the embodiments of at least one of a method, apparatus, non-transitory computer readable medium and system, as represented in the attached figures, is not intended to limit the scope of the application as claimed but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide methods, systems, non-transitory computer readable media, devices, and/or networks, which transform a multi-organization process description into chaincode that can be implemented via a blockchain.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties may be referred to herein as peers or nodes. Each peer maintains a copy of the database records and no single peer can modify the database records without a consensus being reached among the distributed peers. For example, the peers may execute a consensus protocol to validate blockchain storage transactions, group the storage transactions into blocks, and build a hash chain over the blocks. This process forms the ledger by ordering the storage transactions, as is necessary, for consistency. In a public or permission-less blockchain, anyone can participate without a specific identity. Public blockchains often involve native cryptocurrency and use consensus based on a proof of work (PoW). On the other hand, a permissioned blockchain database provides a system which can secure inter-actions among a group of entities which share a common goal but which do not fully trust one another, such as businesses that exchange funds, goods, information, and the like.

A blockchain operates arbitrary, programmable logic tailored to a decentralized storage scheme and referred to as "smart contracts" or "chaincodes." In some cases, specialized chaincodes may exist for management functions and parameters which are referred to as system chaincode. Smart contracts are trusted distributed applications which leverage tamper-proof properties of the blockchain database and an underlying agreement between nodes which is referred to as an endorsement or endorsement policy. In general, blockchain transactions typically must be "endorsed" before being committed to the blockchain while transactions which are not endorsed are disregarded. A typical endorsement policy allows chaincode to specify endorsers for a transaction in the form of a set of peer nodes that are necessary for endorsement. When a client sends the transaction to the peers specified in the endorsement policy, the transaction is executed to validate the transaction. After validation, the transactions enter an ordering phase in which a consensus protocol is used to produce an ordered sequence of endorsed transactions grouped into blocks.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. Peers can also have the role of an endorser, although it is not a requirement. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger is a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain. There is typically one ledger per channel. Each peer node maintains a copy of the ledger for each channel of which they are a member.

A chain is a transaction log which is structured as hash-linked blocks, and each block contains a sequence of N transactions where N is equal to or greater than one. The block header includes a hash of the block's transactions, as well as a hash of the prior block's header. In this way, all transactions on the ledger may be sequenced and cryptographically linked together. Accordingly, it is not possible to tamper with the ledger data without breaking the hash links. A hash of a most recently added blockchain block represents every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger represents the latest values for all keys that are included in the chain transaction log. Because the current state represents the latest key values known to a channel, it is sometimes referred to as a world state. Chaincode invocations execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

Recently, blockchain has been used as an intermediary between multiple untrusted organizations while performing a shared process in which each party collaborates or contributes in some way to the overall process. Multi-party processes (or inter-organization processes) exist in many types of fields including banking, healthcare, politics, real estate, legal, government, rentals and sharing, education, charities and aid organizations, and the like. Typically, these processes involve at least transmission events (or send events), receive events by parties receiving the transmissions, and storage events on the blockchain to record the occurrence of the event. In this case, a significant amount of send, receive, and storage events do not change a state of one or more of the parties.

The example embodiments overcome these drawbacks by converting a multi-party process description (diagram) into a plurality of state representations (e.g., charts, etc.) such that each of the parties have their own respective state chart, including the blockchain. Furthermore, events may be removed from the state representations where a state of the party does not change as is further described herein resulting in reduced state charts. The reduced state charts can be used to develop chaincode (software artifacts) which can be executed by blockchain nodes to carry out the multi-party process efficiently.

Some benefits of the instant solutions described and depicted herein include translating a process model involving all parties into individual state representations of each party thereby simplifying an understanding for each party. Furthermore, the embodiments perform a reduction in the amount of storage events, transmission events, and receiving events for all parties within the multi-party process by removing events from the state representations. Also, a current step of the multi-party process may be identified from the immutable blockchain ledger providing a mechanism for keeping track of the current state of the multi-party process without the need for a central intermediary.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein.

According to various aspects, smart contracts may be used to implement the transformed inter-organization process. For example, smart contracts (chaincode) may contain instructions for executing the reduced state charts described herein. Furthermore, the decentralized nature of the system enables the entire system to be built without relying on a central point of control. Accordingly, trust can be created in a shared manner and without relying on the authority of a single entity.

The example embodiments provide numerous benefits over a traditional database. For example, through the blockchain the embodiments do not need additional mechanisms for managing consistency and trust among parties with conflicting interests, which can create significant costs. Meanwhile, a traditional database would require checks and balances to prevent a single authority from having access and control over the data of multiple parties.

Figure 1B:
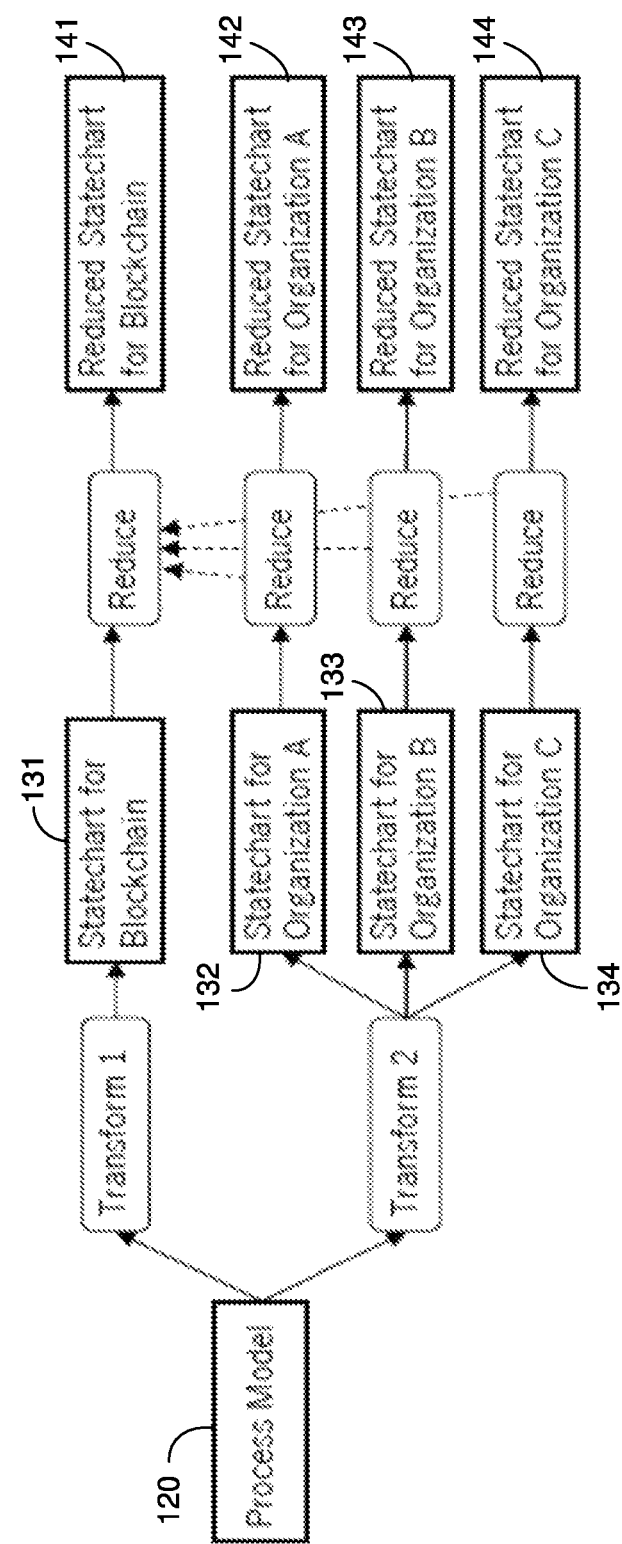
FIG. 1B is a diagram illustrating a process description being transformed into a plurality of state charts according to example embodiments.
Figure 1C:
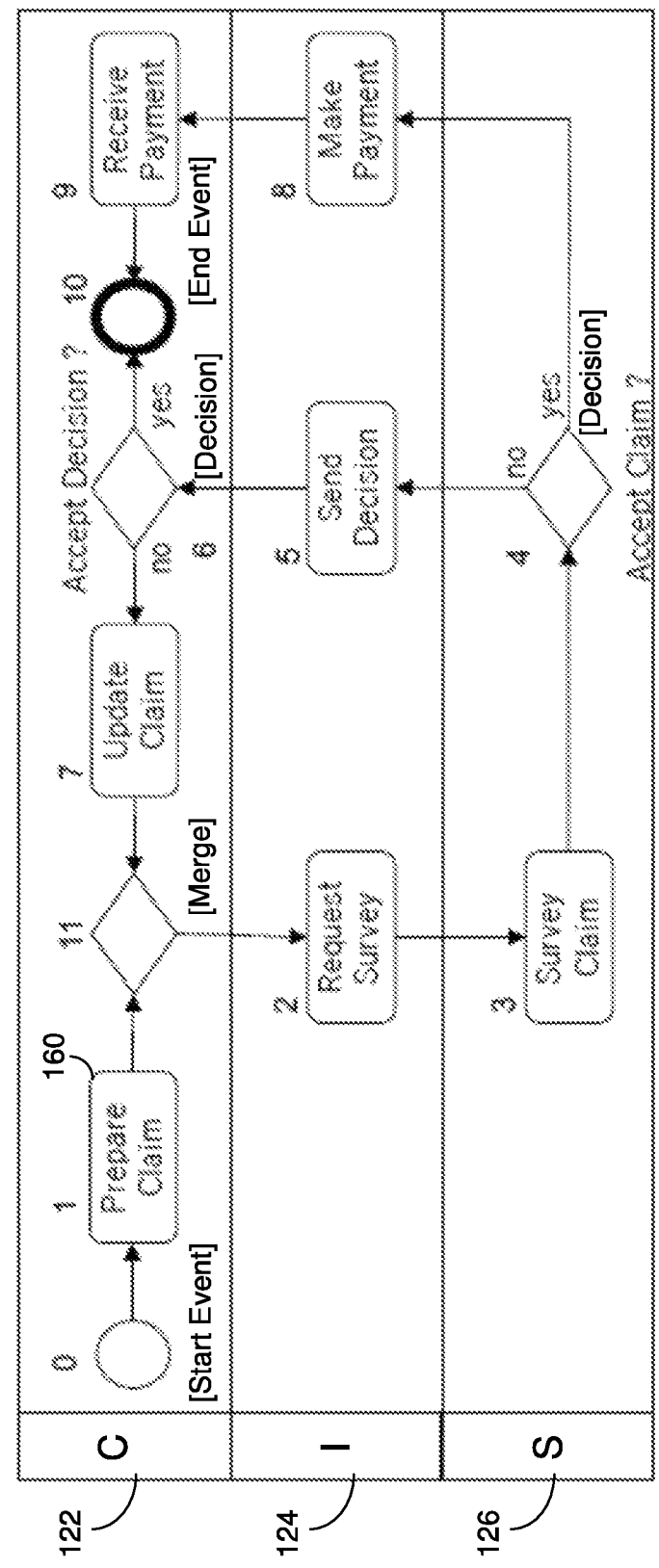
FIG. 1C is a diagram illustrating a state chart according to example embodiments.

FIG. 1A illustrates a shared processing environment 100A with a blockchain as an intermediary according to example embodiments, FIG. 1B illustrates a process description being transformed into a plurality of state charts according to example embodiments, and FIG. 1C illustrates an example of a state chart according to example embodiments. Referring to FIG. 1A, multiple organizations including A, B, and C collaborate to perform a shared multi-party process 110. Here, each organization performs its own respective process 102, 104, and 106, while some aspects of each process overlap with the shared multi-party process 110. According to various embodiments, the shared multi-party process 110 uses a blockchain 111 for recording events that occur between the organizations A, B, and C, and the blockchain.

FIG. 1B illustrates an example of a process 100B of transforming a process model into a plurality of state charts, and then converting the state charts into reduced state chart. Meanwhile, FIG. 1C provides an example of the process model 120. In the example of FIG. 1C, the process model 120 is a description on how things should occur during a process execution. In other words, "process model" can be "process description" or "process definition." Conversion from the process model 120 into reduced state charts 141-144 may be executed outside of blockchain. For example, a person or system may provide the reduced state charts to all blockchain peers. The process model 120 can be in XML, but the example embodiments can also be applied to any non-XML process descriptions.

In the example of FIG. 1B, the process model 120 is initially transformed into a plurality of state charts 131-134 (which may be referred to herein as state representations). Each party and the blockchain may have their own respective state charts. A state chart identifies the events to be performed by the respective party during the multi-party process 110. According to various embodiments, the plurality of state charts 131-134 may have one or more events removed therefrom to create reduced state charts 141-144. Events may be removed to improve efficiency of the processing. For example, consecutive receiving events may not change a state of a party and therefore at least one of the receiving events may be removed.

The process model 120 shown in FIG. 1C illustrates a swim-lane diagram representing the steps performed by each party to the multi-party process 110 shown in FIG. 1A. Here, the parties include a client 122, an insurer 124, and a surveyor 126 which perform an insurance claim process in a collaborative manner. The state charts 131-134 generated in FIG. 1B may represent the events that are performed by each respective party 122, 124, and 126, as well as the blockchain which acts as an intermediary.

Maintaining consistency and mutual trust in inter-organizational business processes has been a long-lasting challenge for IT industries. In a centralized business process within an organization, information on business activities can be shared and validated, and participants of the process trust each other. However, in an inter-organizational process, when process control is handed over to participants outside of an organization, other parties cannot validate data accuracy, enforce obligations, or check if conditions are met. As a result, moving control between fragmented processes of different organizations tends to result in inconsistent and untrusted process management.

Blockchain can be used as a solution to the consistency and trust issues in managing inter-organizational business processes. Transactions in business process networks that span organizations may be shared and validated by participants, which is a mechanism that does not require the participants to trust each other. Transactions between participants may also be processed by smart contracts (also referred to as chaincode) that encodes business logic agreed on by all process participants. Each participant runs a private process of its own, while the entire process shared by the participants is managed by a blockchain as shown in FIG. 1A.

Although blockchain technology has the potential to help shift the level of integration and automation, there are other challenges in managing inter-organizational business processes using blockchain including defining entire workflows that control processes across organizational boundaries, the private processes of the participants must fulfill the responsibilities imposed by the shared process, and because blockchain-based solutions still face technological challenges such as throughput, latency, and size and bandwidth limitations, the mechanism built on top of Blockchain must be highly optimized.

To resolve the challenges mentioned above, the example embodiments include a method for (1) transforming a single business process model into multiple state charts, (2) optimizing the generated state charts, and (3) generating smart contracts and participants applications from the state charts. Because the method allows us to represent an entire workflow that will be automatically transformed into smart contract and Web applications, they are always consistent with each other. The embodiments transform process models into state charts and for optimizing the generated state charts. Software artifacts, which are smart contract and Web applications, may be generated from the state charts.

The example embodiments are different form existing studies in that a simple process diagram such as shown in the example of FIG. 1C may be used as input to generate a state chart as a target of model transformation. The system may dig into the details on how messages are exchanged between participants and how the processes are supported by software process engines, collaboration diagrams or choreography diagrams. State charts have the following advantages over other behavior representations. For example, state charts can represent blockchain as well as multiple process participants as state charts communicating with each other by receiving and sending events. State charts have been standardized so developer support, including tooling and education, is already available. Furthermore, formal aspects of state charts enable composition and optimization to be precisely defined. State charts are also close to implementation, so the final software artifacts can be easily built on the basis of the state charts.

As shown in the example of FIG. 1B, the system takes a process model as input and transforms it into state charts for blockchain and organizations' applications. Then the organizations' state charts are reduced into optimized ones, and using the result of reduction computation, the state chart for Blockchain is also reduced. To define process models, the following small set of modeling elements may be used including a start event that acts as a process trigger, an end event that represents the result of a process, an activity that describes work that must be done, a sequence flow that shows in which order the activities are performed, a decision that creates alternative flows, where only one of the paths can be taken, a merge which combines two alternative sequence paths into one, a swim lane which categorizes activities according to participant roles, where one pool is provided with multiple lanes. FIG. 1C shows an example insurance payment process with two decisions and one merge, where client, insurer, and surveyor are the participants of the process.

After the process is triggered, the client prepares a claim and submits it to the insurer, who then requests the surveyor to survey the claim. The surveyor decides whether the claim is accepted or not. If the surveyor does not accept it, the insurer sends the decision (the claim is not accepted). After receiving the decision, the client also decides whether to accept the decision. In the case that the client does not accept the decision, she updates the claim and submit it to the insurer again; otherwise, the process terminates. If the surveyor accepts the claim, the insurer makes payment, which will be received by the client. For defining a transformation that takes process models as input, a process model may be formalized as a 5-tuple $(O; o_0; F; P; R)$ where O is a set of flow objects, including start and end events, activities, decisions, and merges, $o_0 \in O$ is the start event, $F \subseteq O \times O \times T$ is the flow relation, P is a set of participants, and $R:O \rightarrow P$ i is a mappings associating a flow object to a participant. A flow relation (o; o'; t) represents an object flow from a object o to another object o' whose flow type is denoted by t. When a flow type can be uniquely derived from a source object and target object, we do not describe it explicitly.

We then represent processes shared by multiple organizations by means of a set of state charts. A Blockchain-based infrastructure can be thought of as a state transition system, where a submitted transaction is recorded as a change in state. For an individual participant, a state chart can also be used for behavior description which provides a basis of interface specification as well as implementation of functions. In addition, interaction between process participants and Blockchain can be modeled as a set of state charts that send and receive events for their communication. Thus, using state charts for representing the behavior and interaction of Blockchain and process participants is believed to be a promising approach. When state charts are used for representing shared processes, the mapping between the two different types of models must fulfill two requirements: all communications between participants must be intermediated by Blockchain to ensure consistency and trust, and all participants share the same agreed-upon process.

Figure 1D:
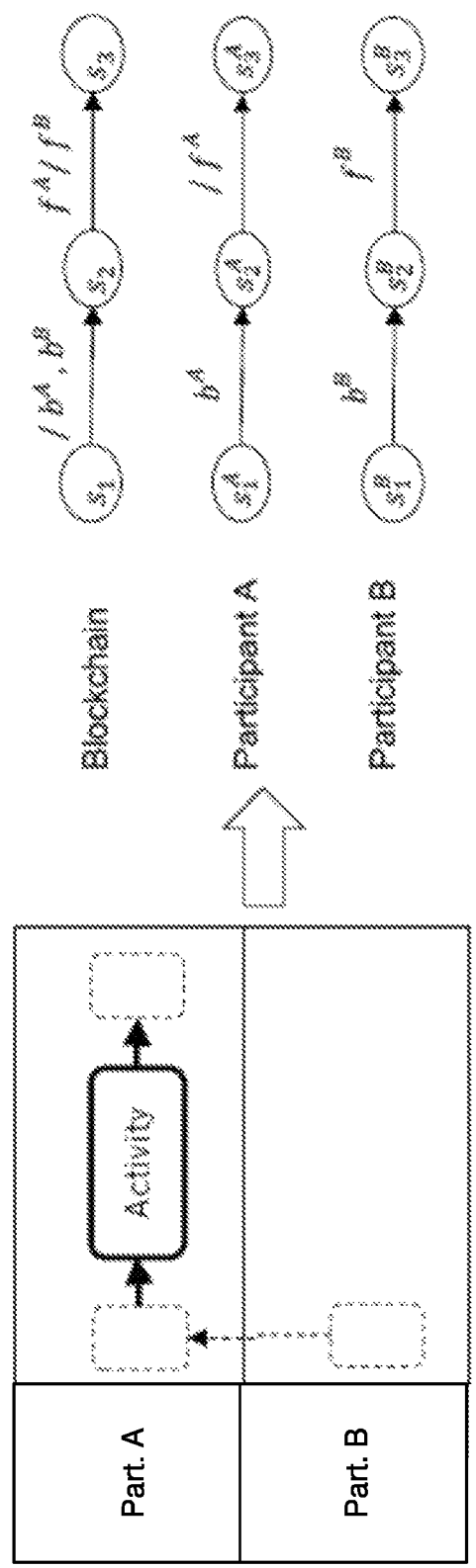
FIG. 1D is a diagram illustrating a process model and corresponding state charts according to example embodiments.

FIG. 1D shows a process 160 of transforming a fragment process model with two participants A and B, into corresponding state charts to represent the behavior of Activity. We use three state charts, one for Blockchain and the others for participants A and B. Here, we denote a transition with an arrow from one state s to another state s' with the label $e/a_1, \ldots, a_n$, where e is an event to receive and $a_1, \ldots, a_n$ are events to send when the transition occurs. We also describe/$a_1, \ldots, a_n$ and e in the case that the transition has no receiving event or sending events, respectively.

All state charts start with the first states $s_1$, $s_1^A$, $s_1^B$. When an object flow goes into Activity, blockchain sends events $b^A$ and $b^B$ and transitions to state s2. When $b^A$ and $b^B$ are received, participants A and B transition to states $f_2^A$ and $f_2^B$, respectively. After Activity is finished, participant A transitions to state $f_3^A$ and sends event $f^A$, which will be received by blockchain. Blockchain then transitions to state $s^3$ and sends event $f^B$ which will be received by participant B. Thus, all communications are intermediated by blockchain and all participants share the same process.

Figure 2A:
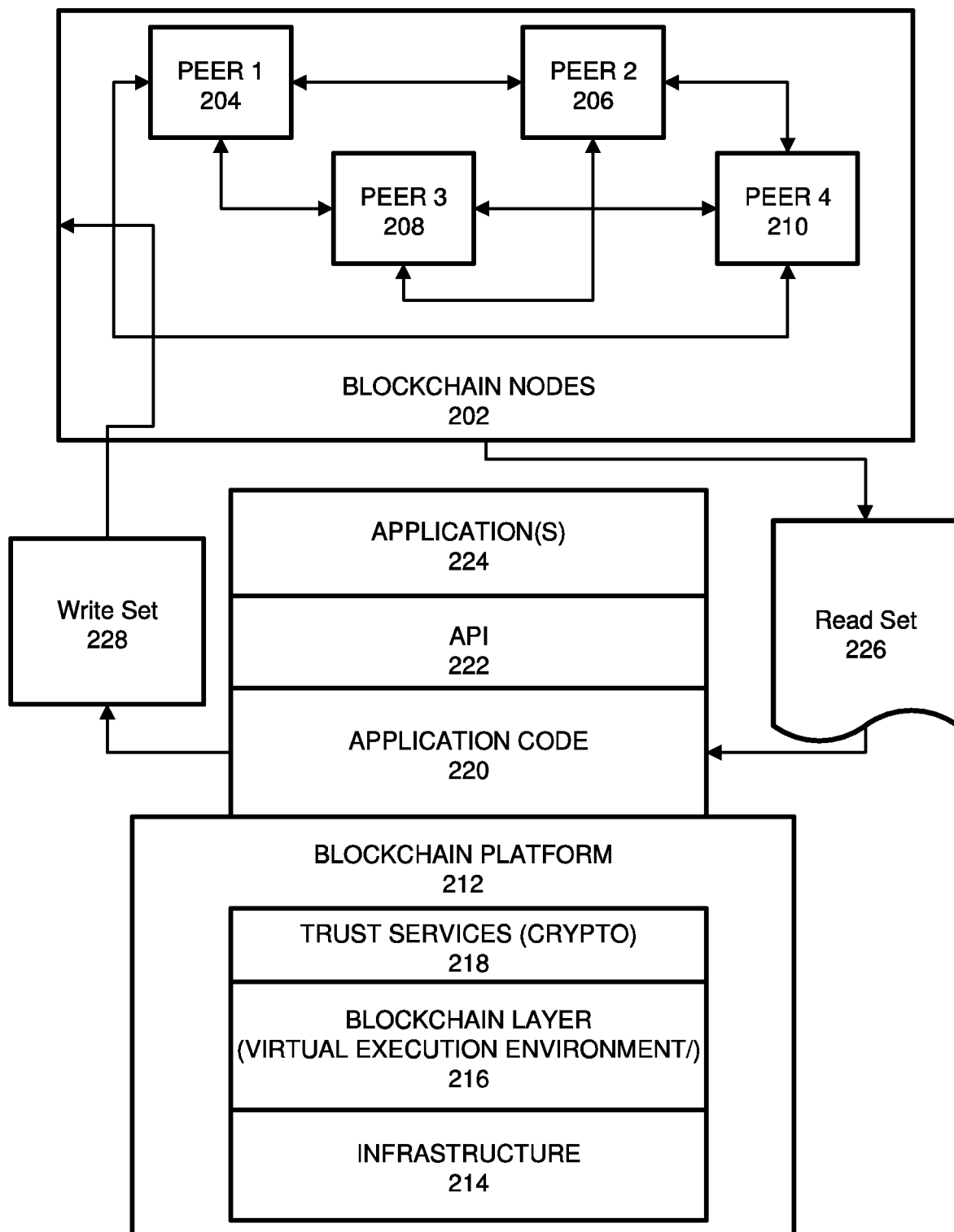
FIG. 2A is a diagram illustrating a peer node blockchain architecture configuration for an asset sharing scenario, according to example embodiments.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes 202 may include one or more nodes 204-210 (these four nodes are depicted by example only). These nodes participate in a number of activities, such as blockchain transaction addition and validation process (consensus). One or more of the blockchain nodes 204-210 may endorse transactions based on endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., chaincode, smart contracts, etc.) which can be created according to a customized configuration sought by participants and can maintain their own state, control their own assets, and receive external information. This can be deployed as a transaction and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new transactions and provide access to auditors which are seeking to access data entries. The blockchain layer 216 may expose an interface that provides access to the virtual execution environment necessary to process the program code and engage the physical infrastructure 214. Cryptographic trust services 218 may be used to verify transactions such as asset exchange transactions and keep information private.

The blockchain architecture configuration of FIG. 2A may process and execute program/application code 220 via one or more interfaces exposed, and services provided, by blockchain platform 212. The code 220 may control blockchain assets. For example, the code 220 can store and transfer data, and may be executed by nodes 204-210 in the form of a smart contract and associated chaincode with conditions or other code elements subject to its execution. As a non-limiting example, smart contracts may be created to execute reminders, updates, and/or other notifications subject to the changes, updates, etc. Furthermore, according to various embodiments smart contracts may be configured to carry out an inter-organization process based on state charts which have been transformed from a process description. The smart contracts can themselves be used to identify rules associated with authorization and access requirements and usage of the ledger. In this example, a read set 226 may be processed by one or more processing entities (e.g., virtual machines) included in the blockchain layer 216. A write set 228 may include changes to key values. The physical infrastructure 214 may be utilized to retrieve any of the data or information described herein.

Within chaincode, a smart contract may be created via a high-level application and programming language, and then written to a block in the blockchain. The smart contract may include executable code which is registered, stored, and/or replicated with a blockchain (e.g., distributed network of blockchain peers). A transaction is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified. According to various embodiments, the read set 226 may include a current processing step of the multi-party process. Meanwhile, the write set 228 may include the execution results of the processing step which may include an identification of the step, sending and receiving events performed during the processing step, and the like.

A chaincode may include the code interpretation of a smart contract, with additional features. As described herein, the chaincode may be program code deployed on a computing network, where it is executed and validated by chain validators together during a consensus process. The chaincode may be generated based on a plurality of state charts of a blockchain and a plurality of off-chain systems. The chaincode receives a hash and retrieves from the blockchain a hash associated with the data template created by use of a previously stored feature extractor. If the hashes of the hash identifier and the hash created from the stored identifier template data match, then the chaincode sends an authorization key to the requested service. The chaincode may write to the blockchain data associated with the cryptographic details.

FIG. 2B illustrates an example of a transactional flow 250 between nodes of the blockchain in accordance with an example embodiment. Referring to FIG. 2B, the transaction flow may include a transaction proposal 291 sent by an application client node 260 to an endorsing peer node 281. The endorsing peer 281 may verify the client signature and execute a chaincode function to initiate the transaction. The output may include the chaincode results, a set of key/value versions that were read in the chaincode (read set), and the set of keys/values that were written in chaincode (write set). The proposal response 292 is sent back to the client 260 along with an endorsement signature, if approved. The client 260 assembles the endorsements into a transaction payload 293 and broadcasts it to an ordering service node 284. The ordering service node 284 then delivers ordered transactions as blocks to all peers 281-283 on a channel. Before committal to the blockchain, each peer 281-283 may validate the transaction. For example, the peers may check the endorsement policy to ensure that the correct allotment of the specified peers have signed the results and authenticated the signatures against the transaction payload 293.

According to various embodiments, the transaction 291 may include a request to execute a multi-party process in which the blockchain is an intermediary between a plurality of off-chain systems such as organizations, groups, companies, users, agencies, and/or the like. The transaction 291 may identify a current step to execute or it may not. The chaincode may be able to determine a next step to execute in the multi-party process based on a current key value for the state of the multi-party process which is stored on the distributed ledger (e.g., world state database, blockchain, etc.) The request may be endorsed by one or more peer nodes and upon successful endorsement, it may be forwarded to the ordering node for inclusion within a data block and storage among the blockchain.

The client node 260 may initiate the transaction 291 by constructing and sending a request to the peer node 281, which is an endorser. The transaction proposal 291 may include a request to store information about execution results of a sub-component of a software model. There may be more than one endorser, but one is shown here for convenience (i.e., peer node 281). The client 260 may include an application (e.g., web application, etc.) that leverages a supported software development kit (SDK), such as NODE, JAVA, PYTHON, and the like, which utilizes an available API to generate a transaction proposal. The transaction proposal 291 is a request to invoke a chaincode function so that data can be read and/or written to the ledger (i.e., write new key value pairs for the assets). The SDK may serve as a shim to package the transaction proposal into a properly architected format (e.g., protocol buffer over a remote procedure call (RPC)) and take the client's cryptographic credentials to produce a unique signature for the transaction proposal.

In response, the endorsing peer node 281 may verify (a) that the transaction proposal is well formed, (b) the transaction has not been submitted already in the past (replay-attack protection), (c) the signature is valid, and (d) that the submitter (client 260, in the example) is properly authorized to perform the proposed operation on that channel. The endorsing peer node 281 may take the transaction proposal inputs as arguments to the invoked chaincode function. The chaincode is then executed against a current state database to produce transaction results including a response value, read set, and write set. According to various embodiments, the transaction results may include a result of executing a current step of the multi-party process. However, no updates are made to the ledger at this point. In 292, the set of values, along with the endorsing peer node's 281 signature is passed back as a proposal response 292 to the SDK of the client 260 which parses the payload for the application to consume.

In response, the application of the client 260 inspects/verifies the endorsing peers signatures and compares the proposal responses to determine if the proposal response is the same. If the chaincode only queried the ledger, the application would inspect the query response and would typically not submit the transaction to the ordering node service 284. If the client application intends to submit the transaction to the ordering node service 284 to update the ledger, the application determines if the specified endorsement policy has been fulfilled before submitting (i.e., did all peer nodes necessary for the transaction endorse the transaction). Here, the client may include only one of multiple parties to the transaction. In this case, each client may have their own endorsing node, and each endorsing node will need to endorse the transaction. The architecture is such that even if an application selects not to inspect responses or otherwise forwards an unendorsed transaction, the endorsement policy will still be enforced by peers and upheld at the commit validation phase.

After successful inspection, in step 293 the client 260 assembles endorsements into a transaction and broadcasts the transaction proposal and response within a transaction message to the ordering node 284. The transaction may contain the read/write sets, the endorsing peers signatures and a channel ID, as well as the timestamp information and multi-party process information described herein such as an identification of the current step executed, send and receive events performed during the step, and the like. The ordering node 284 does not need to inspect the entire content of a transaction in order to perform its operation, instead the ordering node 284 may simply receive transactions from all channels in the network, order them chronologically by channel, and create blocks of transactions per channel.

The blocks of the transaction are delivered from the ordering node 284 to all peer nodes 281-283 on the channel. The transactions 294 within the block are validated to ensure any endorsement policy is fulfilled and to ensure that there have been no changes to ledger state for read set variables since the read set was generated by the transaction execution. Transactions in the block are tagged as being valid or invalid. Furthermore, in step 295 each peer node 281-283 appends the block to the channel's chain, and for each valid transaction the write sets are committed to current state database. An event is emitted, to notify the client application that the transaction (invocation) has been immutably appended to the chain, as well as to notify whether the transaction was validated or invalidated.

Figure 3:
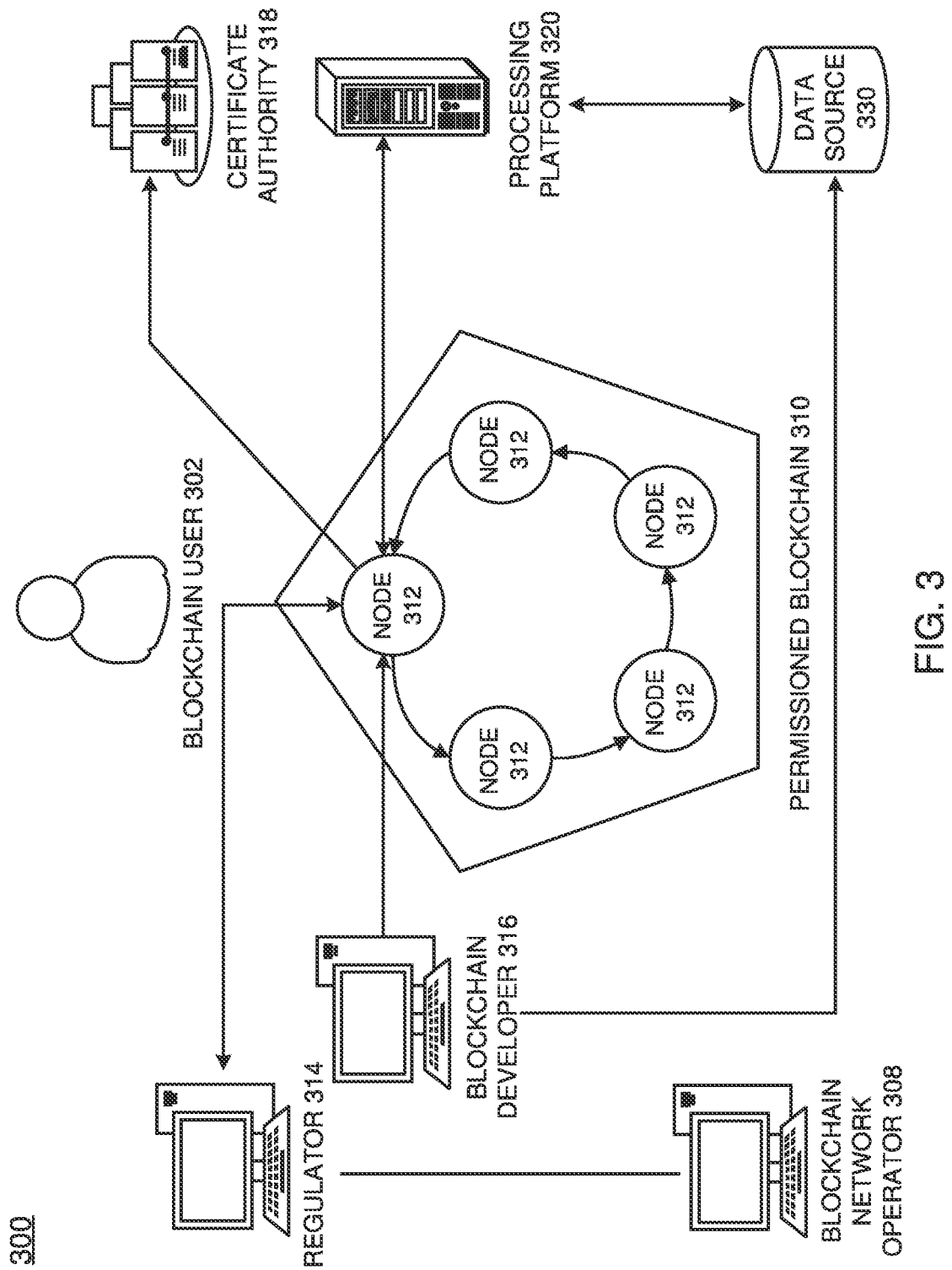
FIG. 3 is a diagram illustrating a permissioned blockchain network, according to example embodiments.

FIG. 3 illustrates an example of a permissioned blockchain network 300, which features a distributed, decentralized peer-to-peer architecture, and a certificate authority 318 managing user roles and permissions. In this example, the blockchain user 302 may submit a transaction to the permissioned blockchain network 310. In this example, the transaction can be a deploy, invoke or query, and may be issued through a client-side application leveraging an SDK, directly through a REST API, or the like. Trusted business networks may provide access to regulator systems 314, such as auditors (the Securities and Exchange Commission in a U.S. equities market, for example). Meanwhile, a blockchain network operator system of nodes 308 manage member permissions, such as enrolling the regulator system 310 as an "auditor" and the blockchain user 302 as a "client." An auditor could be restricted only to querying the ledger whereas a client could be authorized to deploy, invoke, and query certain types of chaincode.

A blockchain developer system 316 writes chaincode and client-side applications. The blockchain developer system 316 can deploy chaincode directly to the network through a REST interface. To include credentials from a traditional data source 330 in chaincode, the developer system 316 could use an out-of-band connection to access the data. In this example, the blockchain user 302 connects to the network through a peer node 312. Before proceeding with any transactions, the peer node 312 retrieves the user's enrollment and transaction certificates from the certificate authority 318. In some cases, blockchain users must possess these digital certificates in order to transact on the permissioned blockchain network 310. Meanwhile, a user attempting to drive chaincode may be required to verify their credentials on the traditional data source 330. To confirm the user's authorization, chaincode can use an out-of-band connection to this data through a traditional processing platform 320.

Figure 4A:
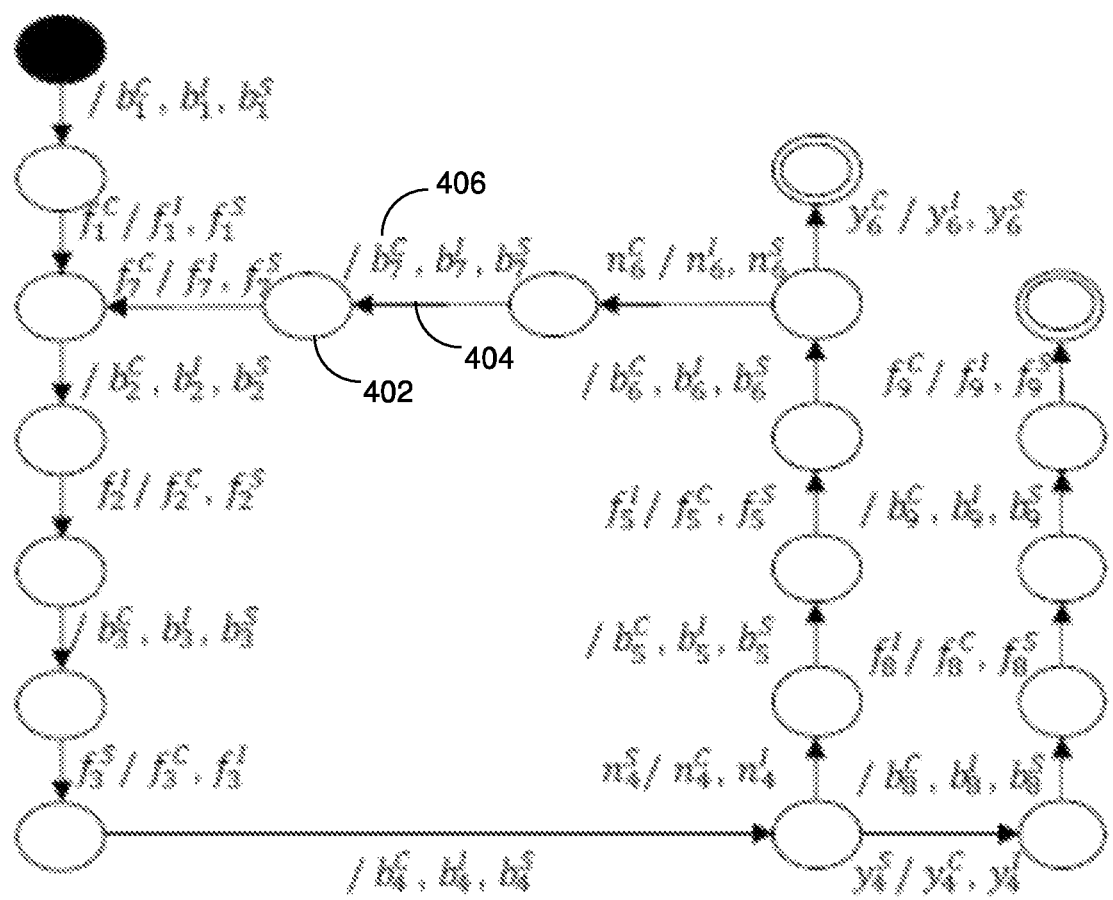
FIGS. 4A-4D are diagrams illustrating state charts created by transforming a process description according to example embodiments.
Figure 4B:
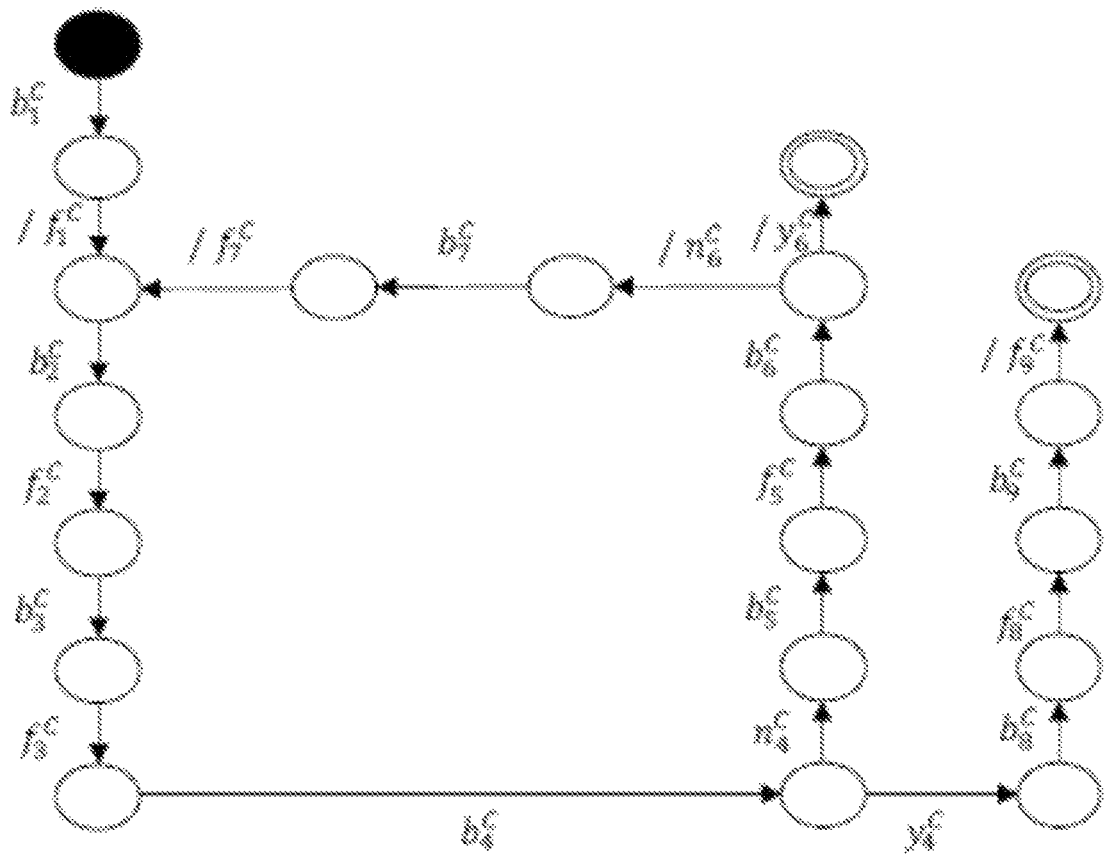
Figure 4C:
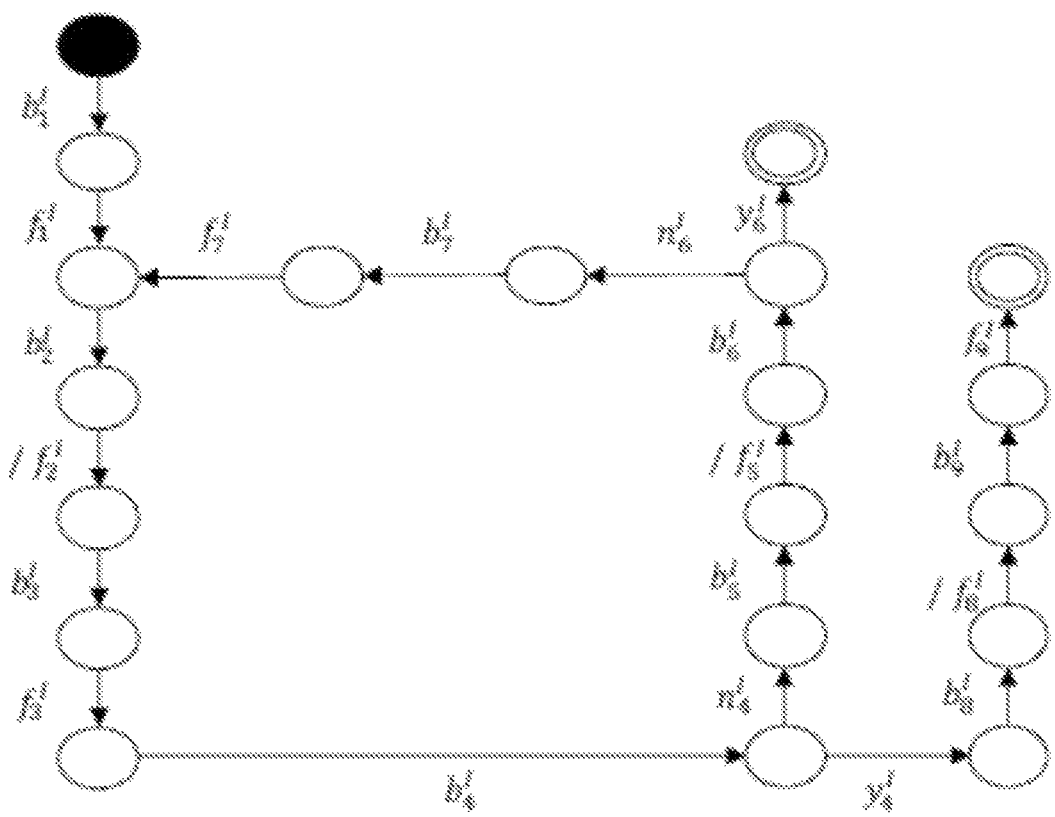
Figure 4D:
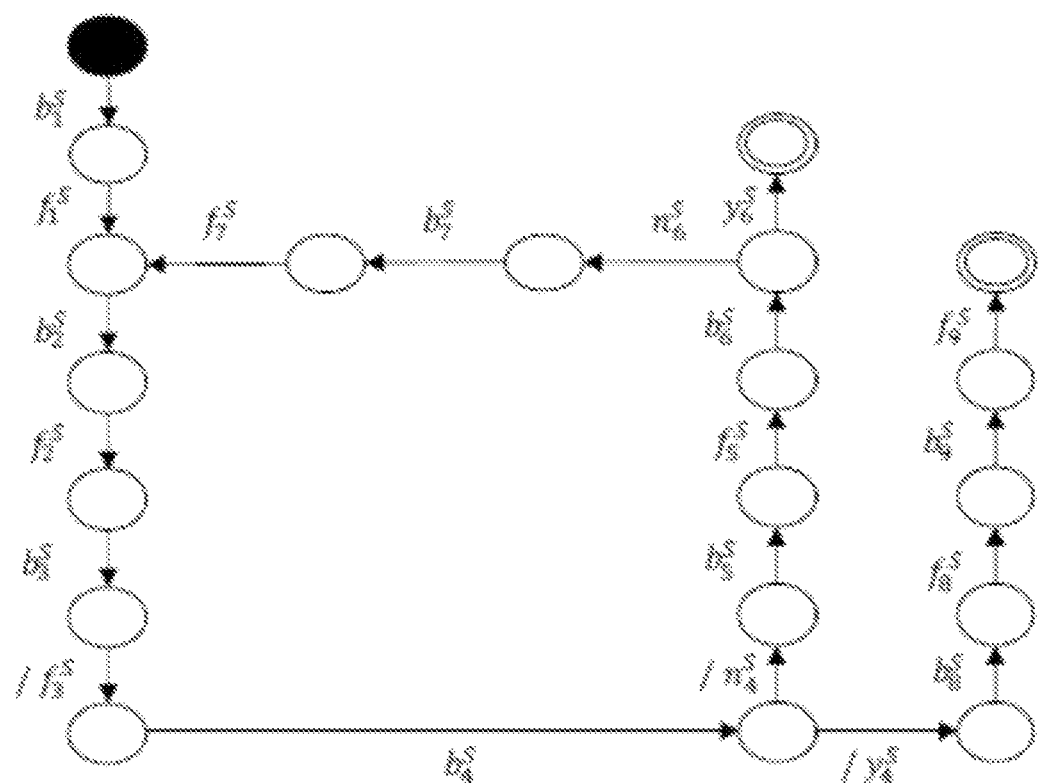

FIG. 4A illustrates an example of a state chart 400A of a blockchain. Furthermore FIGS. 4B-4D illustrate examples of state charts 410A, 420A, and 430A of different respective parties (client, insurer, surety). As shown in the example of FIG. 4A, events are represented by nodes 402 which include links 404 therebetween to identify an order of the events. Also, a listing 406 of sending and receiving events are included next to the links and between two events. The state chart may initially include significantly more events than are necessary due to the redundant storage and transmission functionality associated with multiple parties interacting with a blockchain as an intermediary.

According to various embodiments, the state charts (e.g., state charts 400A-430A) may be generated using sub-procedures that traverse a process model such as the process model 120 shown in the example of FIG. 1C. For example, sub-procedures may be defined to transform a process model into state chart. As one example, sub-procedures may traverse the input process model and create state charts according to the type of objects in the process model. Activity objects and merge objects may be translated into two state transitions, and decision objects may be translated into three state transitions. Attached to transitions are sending and receiving events which constitute the communication. The logic of the sub-procedures may produce state charts having transitions with no receiving and/or sending events. These events may be removed. A function may be used which takes a label, participant, and object as input and associated these with an event that is unique to the combination of these parameters. The function may be used to generate state charts that communicate with each other by exchanging events of the same name. A memory map may be used to hold correspondence between an object in a process model and a state in a state chart. When the function visit's an object that has already been visited before, the logic may reuse the state created before and maintained by the memory map.

Figure 4E:
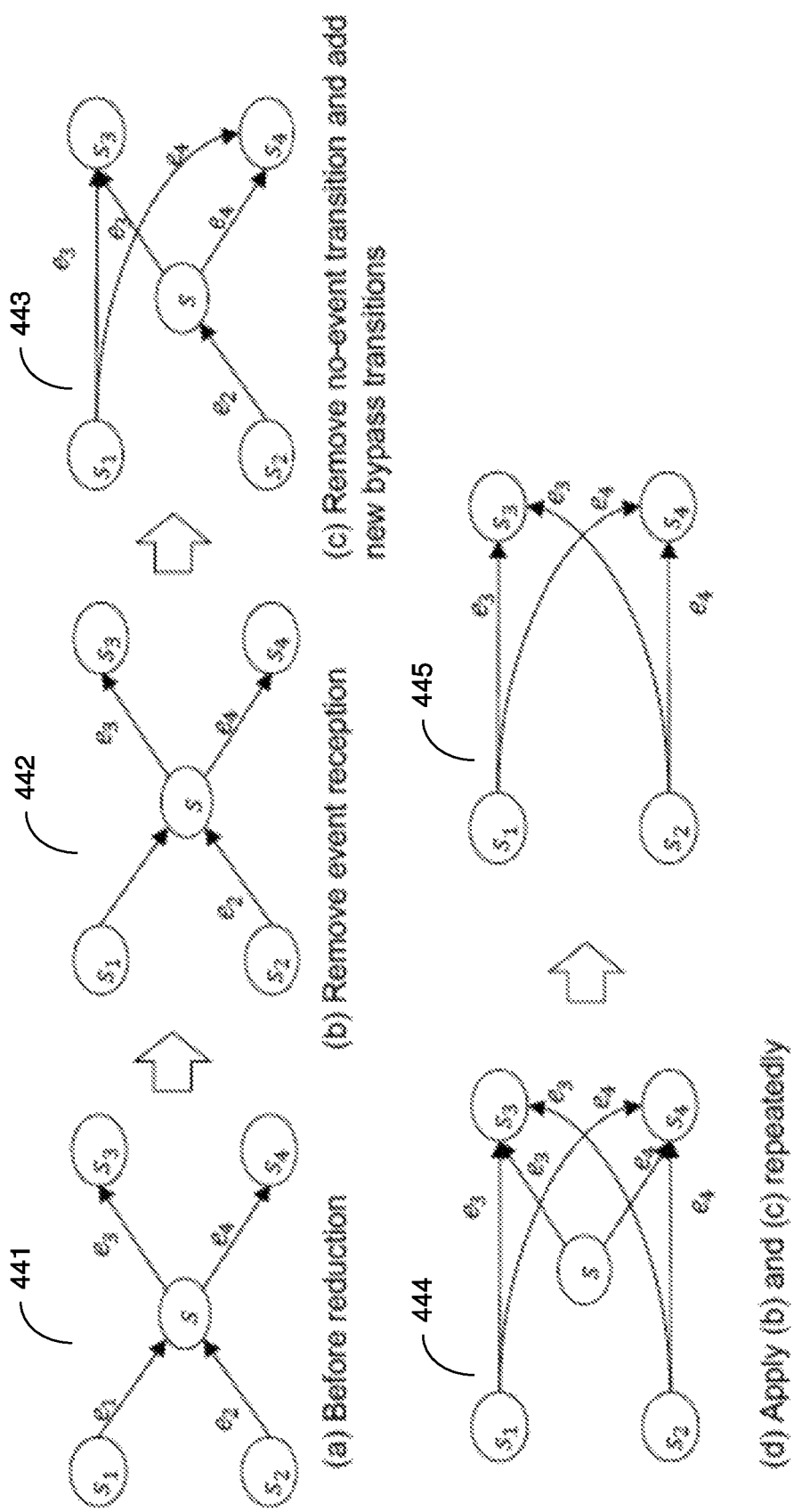
FIG. 4E is a diagram illustrating a process of removing events from a start chart according to example embodiments.

The state charts generated from process models may not be optimal in that events that trigger an activity in a process model are sent to all participants even if the participants are not involved in the activity. To reduce the communication overhead in blockchain-based solutions, the example embodiments may remove as many events as possible. For example, two consecutive transitions that receive events and send no events can identify a situation where events can be removed. In such a case, the path of the state transitions is the same even if we eliminate the receiving event from the first transition. Because no events are sent from the two state transitions, removing the receiving event does not change the behavior observed from outside of the state chart. This principle can be generalized to cases where one state has multiple incoming transitions and/or multiple outgoing transitions. When all outgoing transitions receive events but do not send any events, we can safely remove the receiving event of an incoming transition that does not send any events. In FIG. 4E, s is a state whose outgoing transitions do not sent any events as shown in 441. Therefore, the procedure can eliminate e1 from the transition from s1 to s, in 442. Furthermore, in 443, the system can remove no-event transition and add new transitions to pass through the removed transition. In 444, the system can repeat the removal steps for all incoming transitions of the target state performed in 441-443. In the case that the state becomes inaccessible, we remove the state and its outgoing transitions, in 445.

Figure 4F:
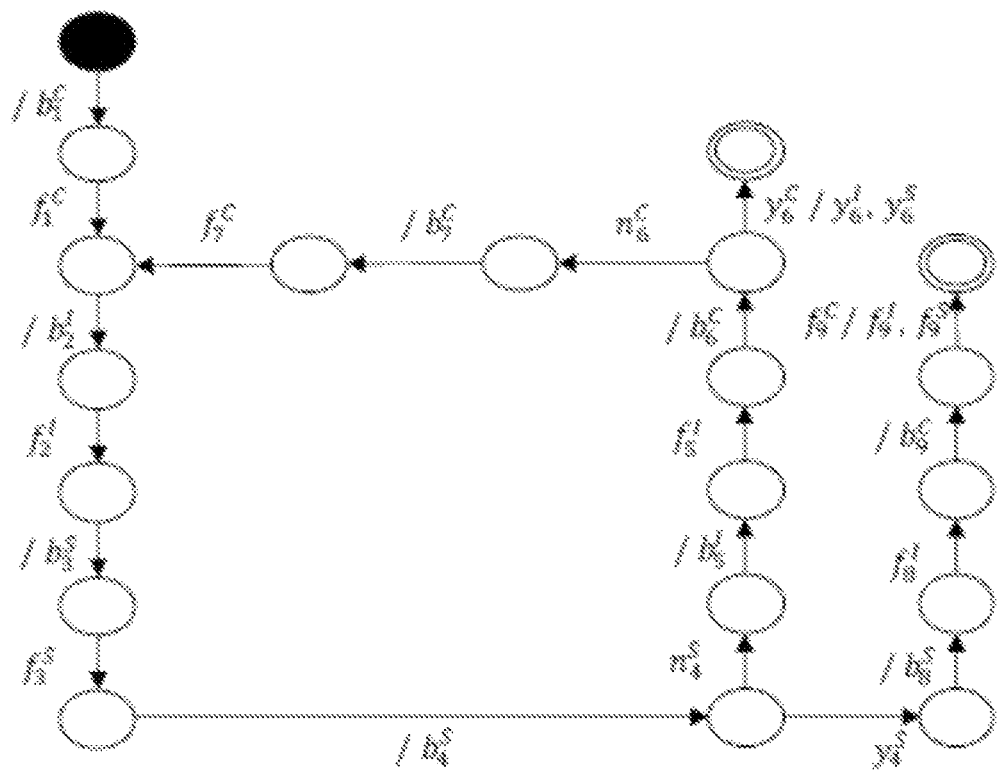
FIGS. 4F and 4G are diagrams illustrating reduced state charts according to example embodiments.
Figure 4G:
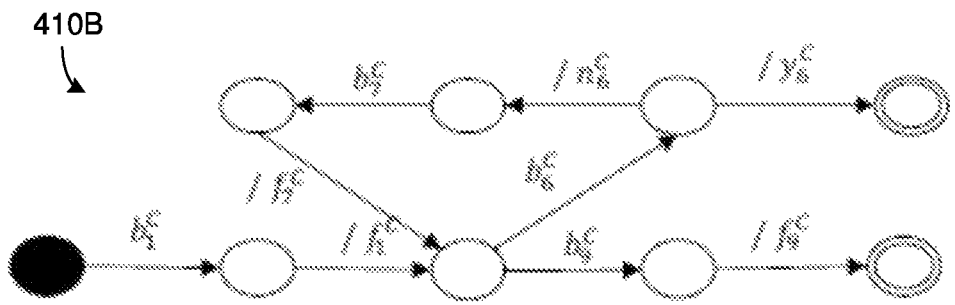
Figure 4G:
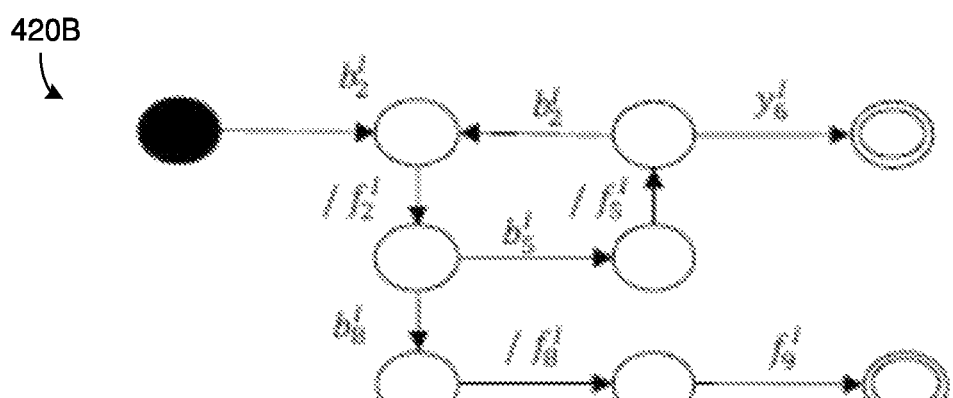
Figure 4G:
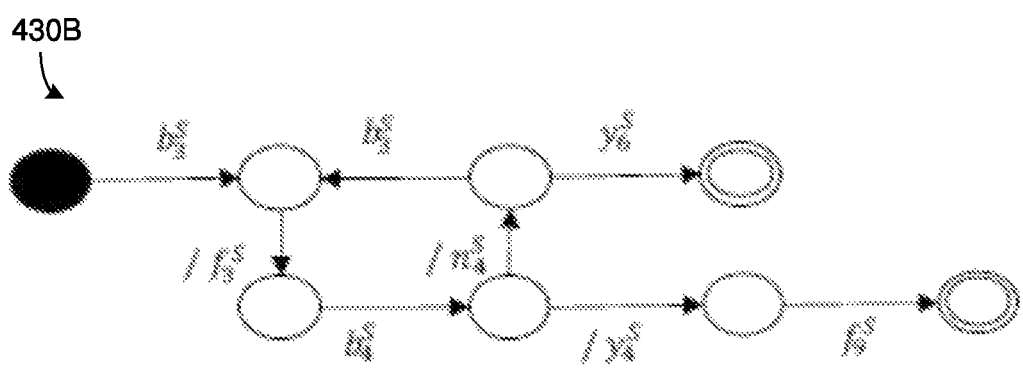

FIG. 4F and FIG. 4G show the reduced state representations. In particular, as shown in FIG. 4F, the blockchain state representation 400A is reduced to reduced representation 400B. Likewise, as shown in FIG. 4G, state representations 410A, 420A, and 430A, are reduced to reduced state representations 410B, 420B, and 430B.

Figure 4H:
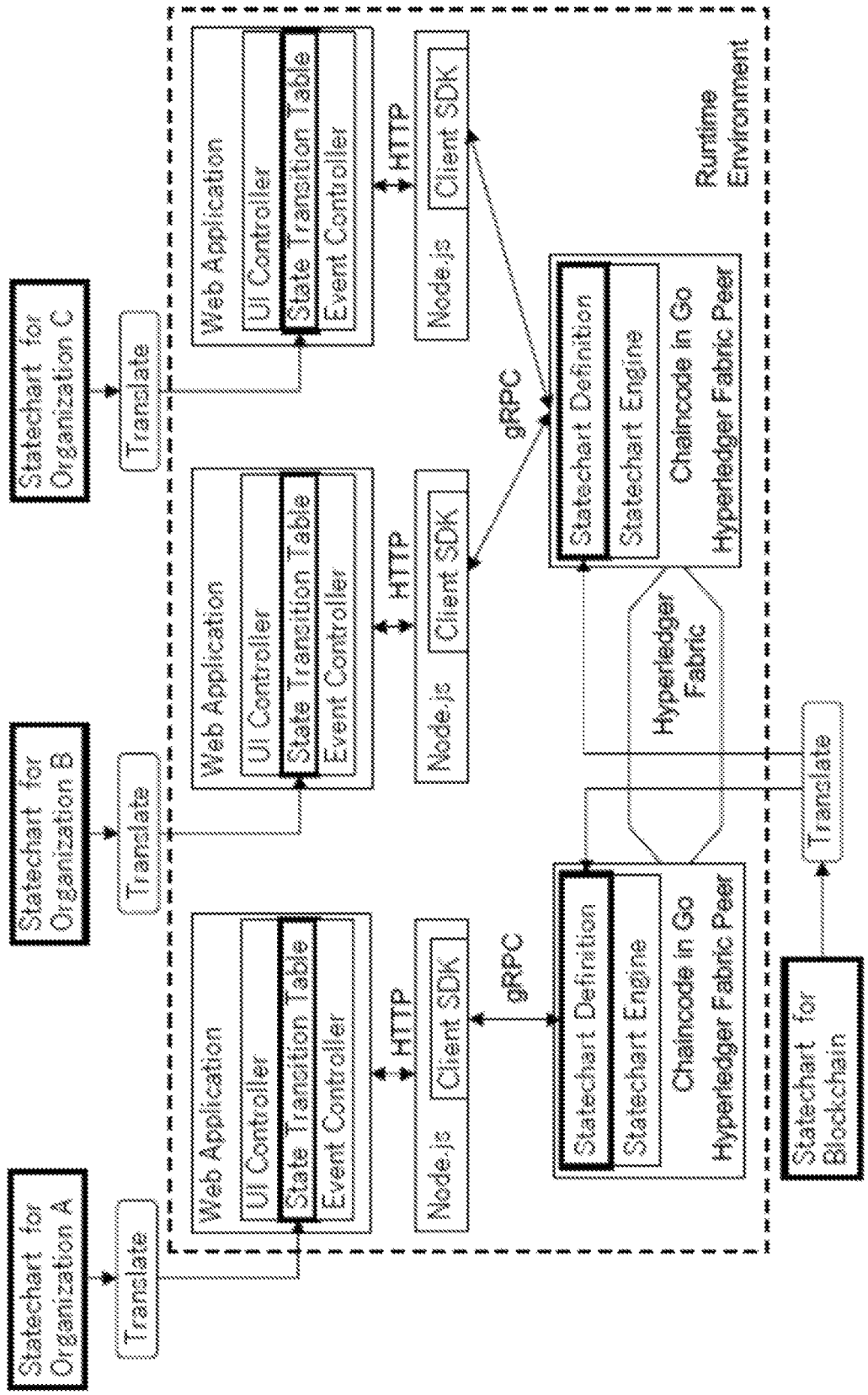
FIG. 4H is a diagram illustrating an architecture for executing chaincode for performing a multi-party process according to example embodiments.

After obtaining reduced state charts for blockchain and process participants, the example embodiments may use these state charts for generating software artifacts, which include smart contracts and Web applications. FIG. 4H illustrates an overview of an architecture 450 for generating smart contract and web applications as well as the resulting software artifacts. The example embodiments may rely on Hyperledger Fabric which is a Blockchain framework as an architecture for hosting smart contracts. For example, a chaincode may include two components: a common state chart engine and a state chart definition. To provide an API for interacting with Hyperledger Fabric, we use its client SDK, which is designed to be used in the Node.js JavaScript runtime. We also created web applications that consume state transition tables generated from state charts and interact with Hyperledger Fabric by exchanging events.

In these examples, JSON data may be interpreted by a state chart engine running on Hyperledger Fabric. SCXML may be used as an intermediate language because supporting tools such as graphical viewers and execution monitors are already available, and it covers complex constructs, such as sub-states and parallel states which facilitate the development of future extensions. When generating a state chart in SCXML, specific state names and event names may be given. As for state names, there may be no clues from the input process models, therefore uniquely generated names may be assigned to states in a state chart. Random names may be allowable because state names are closed inside a state chart. However, events are shared by multiple state charts, so events must have the names that can be agreed on by all participants. The state chart engine on Hyperledger Fabric accepts transactions for requesting state chart operations, such as sending an event to a state chart, which will cause a state transition. Other state chart operations include querying the current state and accessing the event received last time. The API for interacting with such capabilities is provided by the Hyperledger Fabric SDK and mode.js, which installs and instantiates chaincode, submits transactions, and monitor events produced by chaincode.

We also generate Web application skeletons whose behaviors conform the protocols defined by state charts, which are given in the form of state transition tables. Web application skeletons may be built on the basis of Angular, a front-end web application framework in JavaScript. The application may include two custom controllers. A UI controller may first create clickable buttons for all sending events, enables/disables the buttons according to the current state, and induces a transition when an enabled button is clicked by a Web application user. Meanwhile, an event controller may send and receive events through the Node.js server and communicate with the state chart running as a chaincode on Blockchain.

We evaluated the effectiveness of our approach using two insurance process models: Marine Insurance covers the loss of or damage to ships, cargo, and terminals caused by the sea. It involves Importer, Exporter, and Insurer as participants, and the process model contains 22 objects and 25 flows. Re-Insurance is "insurance of insurance" which is purchased by an insurance company and allows an insurance company to remain solvent after major claim events. It involves Reinsurer, Client(insurance company), and Surveyor as participants, and the process model contains 18 objects and 18 flows.

Table 1 and Table 2 summarize the result of our state chart generation and state chart reduction applied to the Marine Insurance process and Re-Insurance process, respectively. They show the number of states, transitions, receiving events, and sending events before and after state chart reduction. The state chart generation produced a set of state charts that work together to correctly execute process models, but the resulting state charts for Blockchain required a relatively large number of receiving and sending events (105 events for 22 objects in Marine Insurance, and 93 events for 18 objects in Re-Insurance). By applying the state chart reduction, we could reduce the number of events by 74% and 65%, which helped us to increase the performance of the entire system. Also the number of state transitions of participants' state charts was reduced to 68% on average, which makes it easier to build and maintain applications that comply with the process models.

TABLE 1

Experiment 1

| | | Before Reduction | | | | After Reduction | | |
|---|---|---|---|---|---|---|---|---|
| Statechart | States | Transitions | Receiving Events | Sending Events | States | Transitions | Receiving Events | Sending Events |
| Blockchain | 31 | 35 | 20 | 85 | 31 | 35 | 20 | 17 |
| Importer | 31 | 35 | 25 | 10 | 19 | 20 | 10 | 10 |
| Exporter | 31 | 35 | 32 | 3 | 7 | 8 | 5 | 3 |
| Insurer | 31 | 35 | 28 | 7 | 13 | 15 | 8 | 7 |

TABLE 2

Experiment 2

| | | Before Reduction | | | | After Reduction | | |
|---|---|---|---|---|---|---|---|---|
| Statechart | States | Transitions | Receiving Events | Sending Events | States | Transitions | Receiving Events | Sending Events |
| Blockchain | 31 | 31 | 16 | 77 | 31 | 31 | 16 | 17 |
| Cedant | 31 | 31 | 27 | 4 | 9 | 9 | 5 | 4 |
| Reinsurer | 31 | 31 | 20 | 11 | 21 | 21 | 10 | 11 |
| Surveyor | 31 | 31 | 30 | 1 | 4 | 3 | 2 | 1 |

Figure 5A:
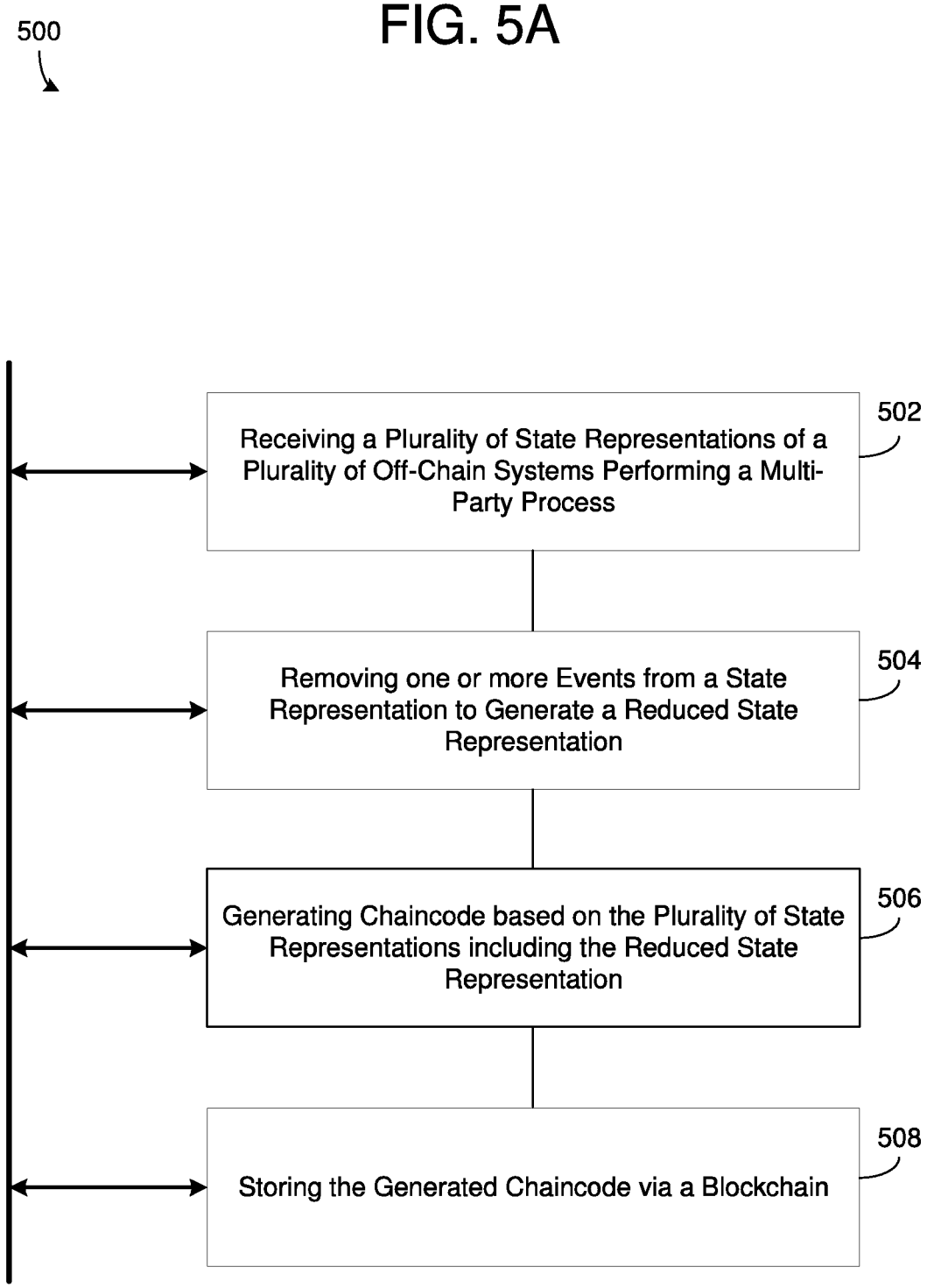
FIG. 5A is a diagram illustrating a method of generating chaincode from a plurality of state charts according to example embodiments.

FIG. 5A illustrates a method 500 of generating chaincode from a plurality of state charts according to example embodiments. For example, the method 500 may be performed by a blockchain peer node that may be a computing system. As another example, the method 500 may be performed by an off-chain system such as a server, a database, a user device, a combination of devices, and the like. In some embodiments, the method 500 may be performed by a combination of any of the systems.

Referring to FIG. 5A, in 502, the method may include receiving a plurality of state representations of a plurality of off-chain systems for performing a multi-party process via a blockchain, wherein each state representation identifies send and receive events of a respective off-chain system. The state representations may include state diagrams in which nodes represent events and links represent relationships between the events. The events within the state representations may include send, receive, storage, etc. events performed by any of the systems. Each party may have its own state representation. Furthermore, the blockchain may have its own state representation.

In some embodiments, the receiving may further include transforming a process description of the multi-party process including the process steps between the plurality of off-chain systems and the blockchain into the plurality of state representations. In this case, the blockchain may be an intermediate communication system between the plurality of off-chain systems within the multi-party process. In some embodiments, the receiving may further include receiving a blockchain state representation that identifies send, receive, and storage events of the blockchain, and the generating of the chaincode is further performed based on the blockchain state representation.

In 504, the method may include removing one or more events from a state representation of an off-chain system to generate a reduced state representation. In some embodiments, events may be removed from each of the state representations. For example, when two consecutive receive events occur without a send event, at least one of the receive events may be removed because it does not change the state of the party. In some embodiments, the removing may include removing the one or more events based on an action performed by the off-chain system during the one or more events. For example, if the action is a receive event, the event may be removed in certain situations. For example, when a receive event from among a group of consecutive receive events within the state representation of the off-chain system may be removed. In some embodiments, the removing may include removing a plurality of receive events of the off-chain system while retaining all sending events of the off-chain system.

In 506, the method may include generating executable chaincode for the blockchain based on the plurality of state representations including the reduced state representation, and in 508, storing the generated chaincode via a blockchain node of the blockchain. The chaincode may be generated based on steps within the state representations where one or more of the event steps have been removed thereby improving the efficiency of the multi-party process by eliminating one or more sending events, receiving events, storage events, or the like.

FIG. 5B illustrates a method 510 of executing a multi-organizational process via a blockchain according to example embodiments. For example, the method 510 may be performed by a blockchain peer node or a group of peer nodes. Referring to FIG. 5B, in 512 the method may include storing chaincode which includes executable steps of a multi-party process generated from a state diagram in which a blockchain is an intermediary between a plurality of off-chain systems. In some embodiments, the state diagram may include a plurality of state representations of a plurality of off-chain systems of the multi-party process. The chaincode may include the steps therein for executing the multi-party process including the ordering of the steps and one or more steps removed from the original state diagrams. In some embodiments, the chaincode is based on one or more reduced state diagrams for one or more of the off-chain systems in which at least one receive event has been removed. For example, the state diagram may be a plurality of reduced state diagrams of the multi-party process for the plurality of off-chain systems of the multi-party process, respectively.

In 514, the method may include receiving a request to execute the multi-party process. For example, the request may include a client node requesting execution of the multi-party process. In this case, the chaincode may identify which step is next based on a most recently executed step stored in a state database of a distributed ledger including the blockchain. Here, the chaincode may identify the current step based on the most recently executed step and the ordering of steps included within the chaincode.

In 516, the method may include processing a step of the multi-party process based on the request via execution of the stored chaincode including the executable steps of the multi-party process to generate a processed result for the step, and, in 518, the method may include storing an identification of the processed step and the generated processed result via a data block among a hash-linked chain of data blocks of the blockchain. In some embodiments, the storing of the identification of the processed step may include storing a current execution state of an off-chain system that is included within the multi-party process. In some embodiments, the storing of the identification of the processed step may include storing events which are sent and/or received by an off-chain system during the execution of the processed step of the multi-party process.

In some embodiments, the method may further include validating the blockchain result generated during the processing using a plurality of peer nodes. In some embodiments, the multi-party process may include a shared process performed by the plurality of off-chain systems and the blockchain. In some embodiments, the method may further include processing a next executable step of the multi-party process, via the blockchain, based on results of the processed step of the multi-party process processed by the blockchain.

Figure 6A:
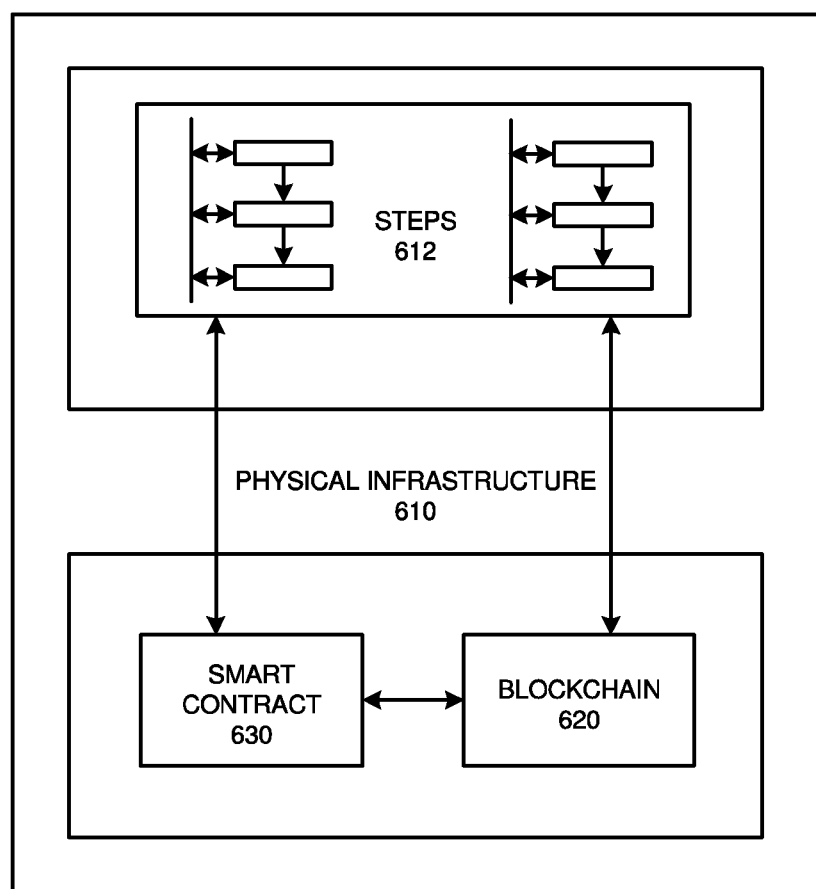
FIG. 6A is a diagram illustrating a physical infrastructure configured to perform various operations on the blockchain in accordance with one or more operations described herein, according to example embodiments.

FIG. 6A illustrates an example physical infrastructure configured to perform various operations on the blockchain in accordance with one or more of the example methods of operation according to example embodiments. Referring to FIG. 6A, the example configuration 600A includes a physical infrastructure 610 with a blockchain 620 and a smart contract 630, which may execute any of the operational steps 612 included in any of the example embodiments. According to various embodiments, the steps/operations 612 may include executing reduced state diagrams of different parties of a multi-party process. The steps may represent output or written information that is written or read from one or more smart contracts 630 and/or blockchains 620 that reside on the physical infrastructure 610 of a computer system configuration. The data can be output from an executed smart contract 630 and/or blockchain 620. The physical infrastructure 610 may include one or more computers, servers, processors, memories, and/or wireless communication devices.

Figure 6B:
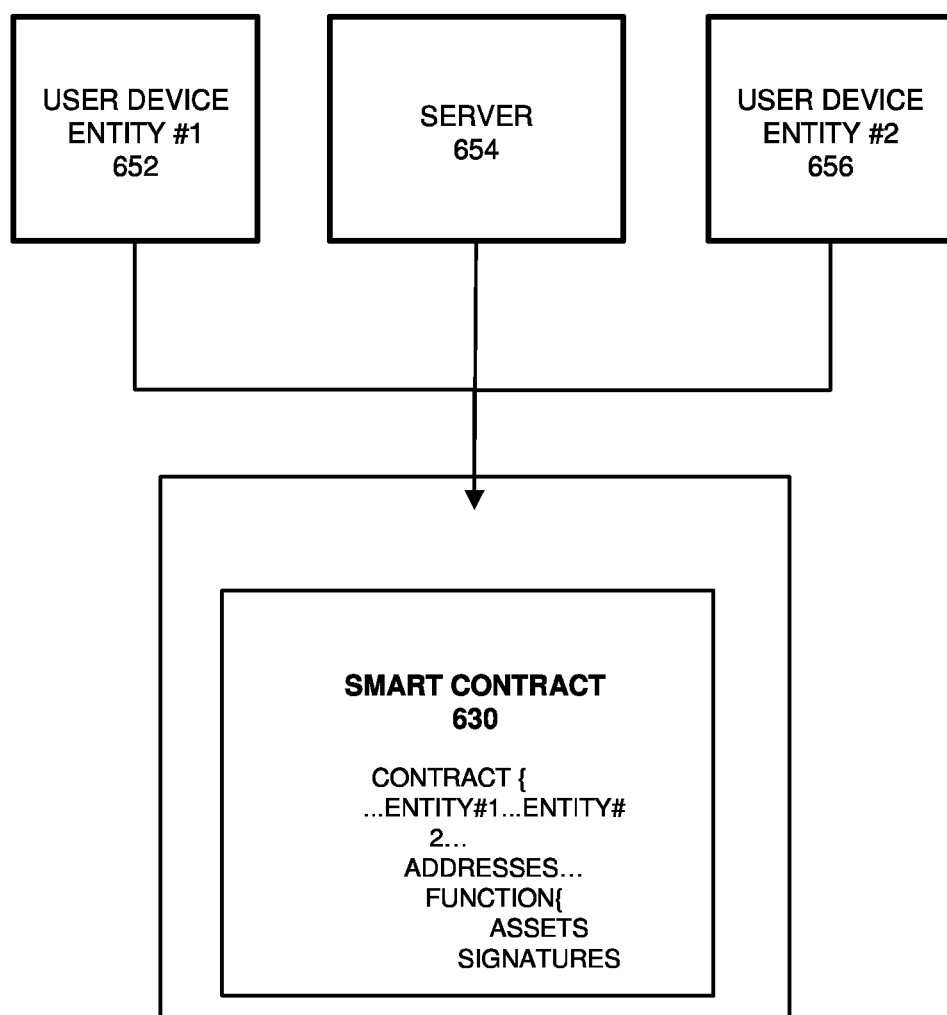
FIG. 6B is a diagram illustrating a smart contract configuration among contracting parties and a mediating server configured to enforce smart contract terms on a blockchain, according to example embodiments.

FIG. 6B illustrates an example smart contract configuration among contracting parties and a mediating server configured to enforce the smart contract terms on the blockchain according to example embodiments. Referring to FIG. 6B, the configuration 650B may represent a communication session, an asset transfer session or a multi-party process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain as a blockchain transaction.

Figure 6C:
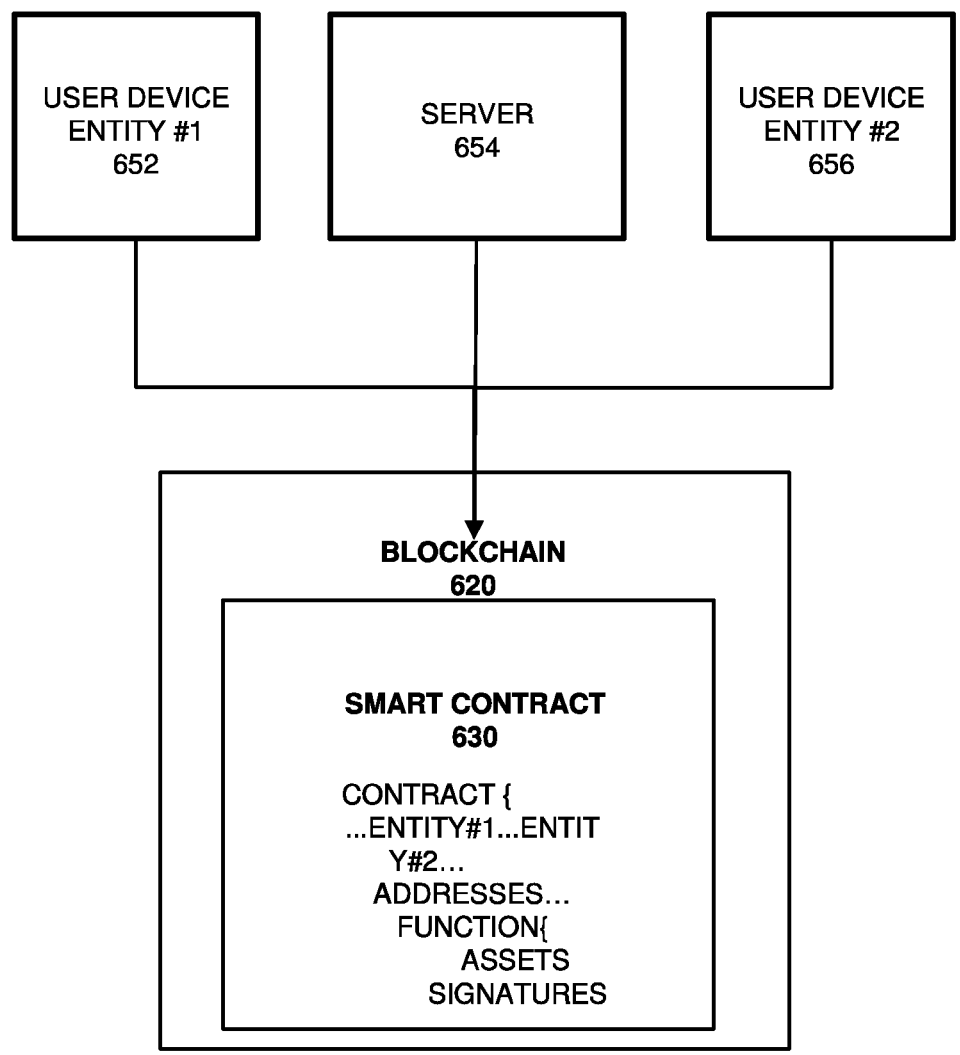
FIG. 6C is a diagram illustrating a smart contract configuration among contracting parties and a mediating server configured to enforce the smart contract terms on the blockchain according to example embodiments.

FIG. 6C illustrates an example smart contract configuration among contracting parties and a mediating server configured to enforce the smart contract terms on the blockchain according to example embodiments. Referring to FIG. 6C, the configuration 650 may represent a modified data file authentication session, a communication session, an asset transfer session or a process or procedure that is driven by a smart contract 630 which explicitly identifies one or more user devices 652 and/or 656. The execution, operations and results of the smart contract execution may be managed by a server 654. Content of the smart contract 630 may require digital signatures by one or more of the entities 652 and 656 which are parties to the smart contract transaction. The results of the smart contract execution may be written to a blockchain 620 as a blockchain transaction. The smart contract 630 resides on the blockchain 620 which may reside on one or more computers, servers, processors, memories, and/or wireless communication devices.

Figure 6D:
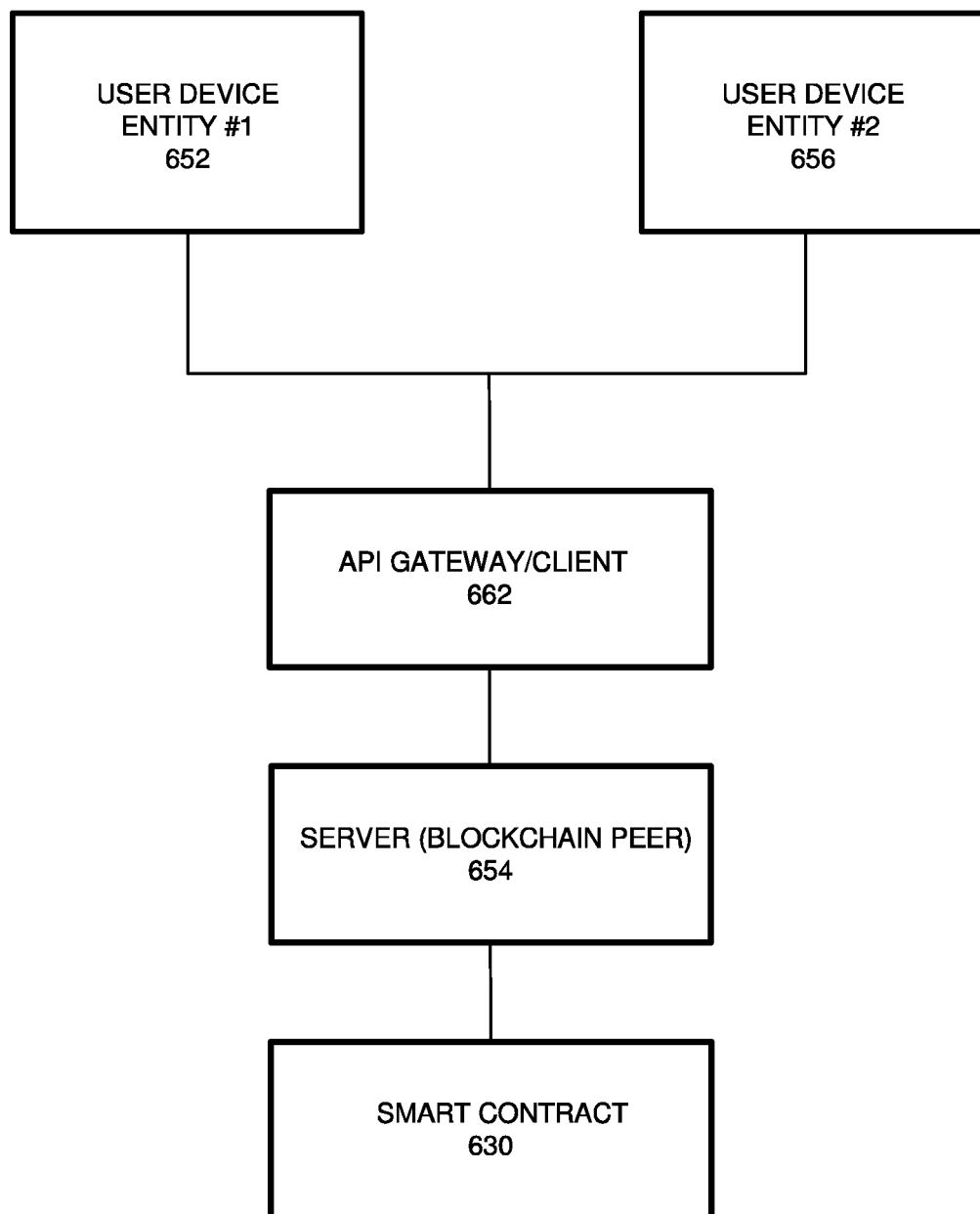
FIG. 6D is a diagram illustrating another example blockchain-based smart contact system, according to example embodiments.

FIG. 6D illustrates a common interface for accessing logic and data of a blockchain, according to example embodiments. Referring to the example of FIG. 6D, an application programming interface (API) gateway 662 provides a common interface for accessing blockchain logic (e.g., smart contract 630 or other chaincode) and data (e.g., distributed ledger, etc.) In this example, the API gateway 662 is a common interface for performing transactions (invoke, queries, etc.) on the blockchain by connecting one or more entities 652 and 656 to a blockchain peer (i.e., server 654). The server 654 is a blockchain network peer component that holds a copy of the world state (which may include a key value store) within a distributed ledger allowing clients 652 and 656 to query data on the world state as well as submit transactions into the blockchain network where, depending on the smart contract 630 and endorsement policy, endorsing peers will run the smart contracts 630.

Figure 7B:
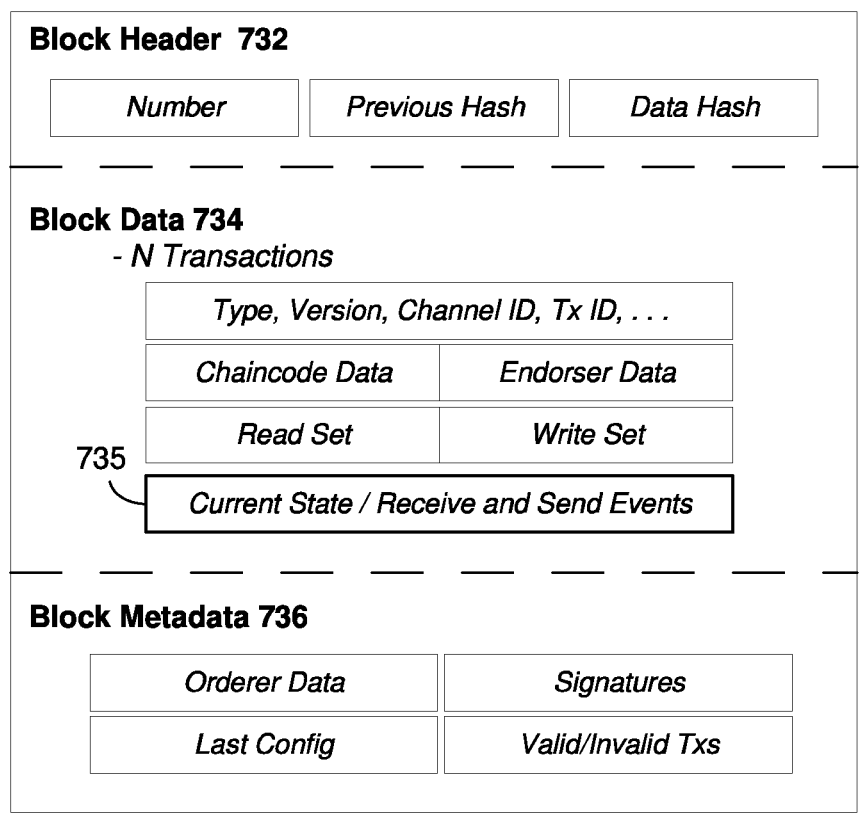
FIG. 7B is a diagram illustrating contents of a data block structure for blockchain, according to example embodiments.

FIG. 7A illustrates a process 700 of a new block 730 being added to a distributed ledger 720, according to example embodiments, and FIG. 7B illustrates contents of a block structure 730 for blockchain, according to example embodiments. Referring to FIG. 7A, clients (not shown) may submit transactions to blockchain nodes 711, 712, and/or 713. Clients may be instructions received from any source to enact activity on the blockchain. As an example, clients may be applications (based on a SDK) that act on behalf of a requester, such as a device, person or entity to propose transactions for the blockchain. The plurality of blockchain peers (e.g., blockchain nodes 711, 712, and 713) may maintain a state of the blockchain network and a copy of the distributed ledger 720.

Different types of blockchain nodes/peers may be present in the blockchain network including endorsing peers which simulate and endorse transactions proposed by clients and committing peers which verify endorsements, validate transactions, and commit transactions to the distributed ledger 720. In this example, the blockchain nodes 711, 712, and 713 may perform the role of endorser node, committer node, or both. As described herein, transactions may include send events, receive events, storage events, and the like of a multi-party process that is carried out between multiple untrusted organizations.

The distributed ledger 720 includes a blockchain 722 which stores immutable, sequenced records in blocks, and a state database 724 (current world state) maintaining a current state (key values) of the blockchain 722. One distributed ledger 720 may exist per channel and each peer maintains its own copy of the distributed ledger 720 for each channel of which they are a member. The blockchain 722 is a transaction log, structured as hash-linked blocks where each block contains a sequence of N transactions. Blocks (e.g., block 730) may include various components such as shown in FIG. 7B. The linking of the blocks (shown by arrows in FIG. 7A) may be generated by adding a hash of a prior block's header within a block header of a current block. In this way, all transactions on the blockchain 722 are sequenced and cryptographically linked together preventing tampering with blockchain data without breaking the hash links. Furthermore, because of the links, the latest block in the blockchain 722 represents every transaction that has come before it. The blockchain 722 may be stored on a peer file system (local or attached storage), which supports an append-only blockchain workload.

The current state of the blockchain 722 and the distributed ledger 720 may be stored in the state database 724. Here, the current state data represents the latest values for all keys ever included in the chain transaction log of the blockchain 722. Chaincode invocations execute transactions against the current state in the state database 724. To make these chaincode interactions extremely efficient, the latest values of all keys may be stored in the state database 724. The state database 724 may include an indexed view into the transaction log of the blockchain 722 and can therefore be regenerated from the chain at any time. The state database 724 may automatically get recovered (or generated if needed) upon peer startup, before transactions are accepted.

Endorsing nodes receive transactions from clients and endorse the transaction based on simulated results. Endorsing nodes hold smart contracts which simulate the transaction proposals. For an authentication, the endorsing node may attempt to decrypt a hashed modified data file using a public key of the node that performed the hash. The nodes needed to endorse a transaction depends on an endorsement policy which may be specified within chaincode. An example of an endorsement policy is "the majority of endorsing peers must endorse the transaction." Different channels may have different endorsement policies. Endorsed transactions are forward by the client application to an ordering service 710.

The ordering service 710 accepts endorsed transactions, orders them into a block, and delivers the blocks to the committing peers. For example, the ordering service 710 may initiate a new block when a threshold of transactions has been reached, a timer times out, or another condition. In the example of FIG. 7A, blockchain node 712 is a committing peer that has received a new data block 730 for storage on blockchain 722.

The ordering service 710 may be made up of a cluster of orderers. The ordering service 710 does not process transactions, smart contracts, or maintain the shared ledger. Rather, the ordering service 710 may accept the endorsed transactions, and specifies the order in which those transactions are committed to the distributed ledger 720. The architecture of the blockchain network may be designed such that the specific implementation of 'ordering' (e.g., Solo, Kafka, BFT, etc.) becomes a pluggable component.

Transactions are written to the distributed ledger 720 in a consistent order. The order of transactions is established to ensure that the updates to the state database 724 are valid when they are committed to the network. Unlike a cryptocurrency blockchain system (e.g., Bitcoin, etc.) where ordering occurs through the solving of a cryptographic puzzle, or mining, in this example the parties of the distributed ledger 720 may choose the ordering mechanism that best suits that network such as chronological ordering.

When the ordering service 710 initializes a new block 730, the new block 730 may be broadcast to committing peers (e.g., blockchain nodes 711, 712, and 713). In response, each committing peer validates the transaction within the new block 730 by checking to make sure that the read set and the write set still match the current world state in the state database 724. Specifically, the committing peer can determine whether the read data that existed when the endorsers simulated the transaction is identical to the current world state in the state database 724. When the committing peer validates the transaction, the transaction is written to the blockchain 722 on the distributed ledger 720, and the state database 724 is updated with the write data from the read-write set. If a transaction fails, that is, if the committing peer finds that the read-write set does not match the current world state in the state database 724, the transaction ordered into a block will still be included in that block, but it will be marked as invalid, and the state database 724 will not be updated.

Referring to FIG. 7B, a block 730 (also referred to as a data block) that is stored on the blockchain 722 of the distributed ledger 720 may include multiple data segments such as a block header 732, block data 734, and block metadata 736. It should be appreciated that the various depicted blocks and their contents, such as block 730 and its contents shown in FIG. 7B are merely for purposes of example and are not meant to limit the scope of the example embodiments. In some cases, both the block header 732 and the block metadata 736 may be smaller than the block data 734 which stores transaction data, however this is not a requirement. The block 730 may store transactional information of N transactions (e.g., 100, 500, 1000, 2000, 3000, etc.) within the block data 734. According to various embodiments, each transaction may include multi-party process data 735 within the block data 734 that is added by the ordering node 710. The multi-party process data 735 may include an identification of the current step that is executed, send and receive events performed during the step, and the like.

The block 730 may also include a link to a previous block (e.g., on the blockchain 722 in FIG. 7A) within the block header 732. In particular, the block header 732 may include a hash of a previous block's header. The block header 732 may also include a unique block number, a hash of the block data 734 of the current block 730, and the like. The block number of the block 730 may be unique and assigned in an incremental/sequential order starting from zero. The first block in the blockchain may be referred to as a genesis block which includes information about the blockchain, its members, the data stored therein, etc.

The block data 734 may store transactional information of each transaction that is recorded within the block 730. For example, the transaction data stored within block data 734 may include one or more of a type of the transaction, a version, a timestamp (e.g., final calculated timestamp, etc.), a channel ID of the distributed ledger 720, a transaction ID, an epoch, a payload visibility, a chaincode path (deploy tx), a chaincode name, a chaincode version, input (chaincode and functions), a client (creator) identify such as a public key and certificate, a signature of the client, identities of endorsers, endorser signatures, a proposal hash, chaincode events, response status, namespace, a read set (list of key and version read by the transaction, etc.), a write set (list of key and value, etc.), a start key, an end key, a list of keys, a Merkel tree query summary, and the like. The transaction data may be stored for each of the N transactions.

The block metadata 736 may store multiple fields of metadata (e.g., as a byte array, etc.). Metadata fields may include signature on block creation, a reference to a last configuration block, a transaction filter identifying valid and invalid transactions within the block, last offset persisted of an ordering service that ordered the block, and the like. The signature, the last configuration block, and the orderer metadata may be added by the ordering service 710. Meanwhile, a committing node of the block (such as blockchain node 712) may add validity/invalidity information based on an endorsement policy, verification of read/write sets, and the like. The transaction filter may include a byte array of a size equal to the number of transactions in the block data 734 and a validation code identifying whether a transaction was valid/invalid.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 8 illustrates an example computer system architecture 800, which may represent or be integrated in any of the above-described components, etc.

Figure 8:
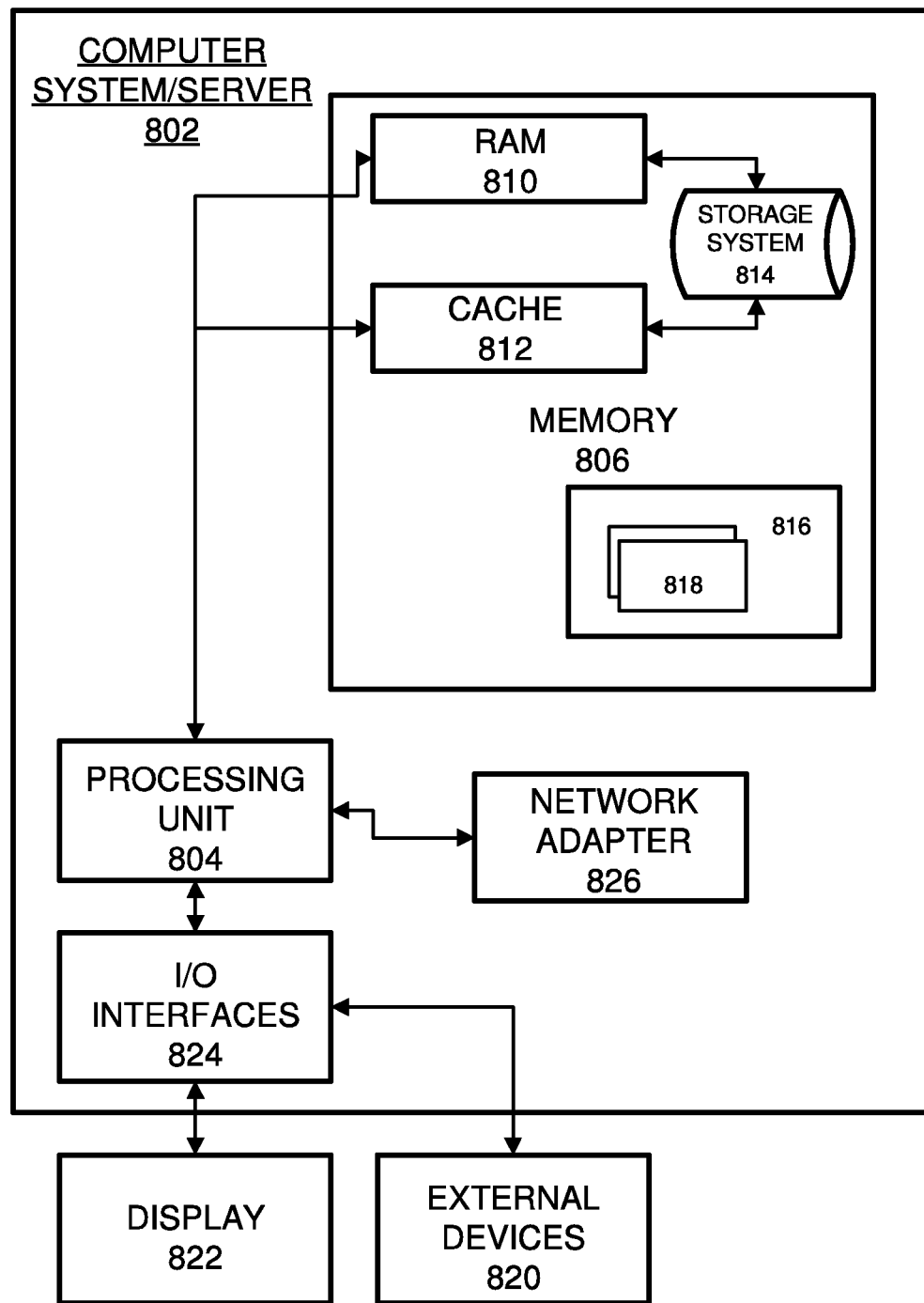
FIG. 8 is a diagram illustrating an example computer system configured to support one or more of the example embodiments.

FIG. 8 is not intended to suggest any limitation as to the scope of use or functionality of embodiments of the application described herein. Regardless, the computing node 800 is capable of being implemented and/or performing any of the functionality set forth hereinabove. For example, the computing node 800 may perform the method shown and described with respect to FIG. 5.

In computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 804, a system memory 806, and a bus that couples various system components including system memory 806 to processor 804.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media. System memory 806, in one embodiment, implements the flow diagrams of the other figures. The system memory 806 can include computer system readable media in the form of volatile memory, such as random-access memory (RAM) 810 and/or cache memory 812. Computer system/server 802 may further include other removable/non-removable, volatile/non-volatile computer system storage media. By way of example only, storage system 814 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 806 may include at least one program product having a set (e.g., at least one) of program modules that are configured to carry out the functions of various embodiments of the application.

Program/utility 816, having a set (at least one) of program modules 818, may be stored in memory 806 by way of example, and not limitation, as well as an operating system, one or more application programs, other program modules, and program data. Each of the operating system, one or more application programs, other program modules, and program data or some combination thereof, may include an implementation of a networking environment. Program modules 818 generally carry out the functions and/or methodologies of various embodiments of the application as described herein.

As will be appreciated by one skilled in the art, aspects of the present application may be embodied as a system, method, or computer program product. Accordingly, aspects of the present application may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present application may take the form of a computer program product embodied in one or more computer readable medium(s) having computer readable program code embodied thereon.

Computer system/server 802 may also communicate with one or more external devices 820 such as a keyboard, a pointing device, a display 822, etc.; one or more devices that enable a user to interact with computer system/server 802; and/or any devices (e.g., network card, modem, etc.) that enable computer system/server 802 to communicate with one or more other computing devices. Such communication can occur via I/O interfaces 824. Still yet, computer system/server 802 can communicate with one or more networks such as a local area network (LAN), a general wide area network (WAN), and/or a public network (e.g., the Internet) via network adapter 826. As depicted, network adapter 826 communicates with the other components of computer system/server 802 via a bus. It should be understood that although not shown, other hardware and/or software components could be used in conjunction with computer system/server 802. Examples include, but are not limited to: microcode, device drivers, redundant processing units, external disk drive arrays, RAID systems, tape drives, and data archival storage systems, etc.

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A computing system comprising:
    a network interface configured to receive a plurality of state charts of a plurality of participants of a multi-party process in which a blockchain is an intermediary between a plurality of off-chain systems; and
    a processor configured to
        remove steps from the plurality of state charts based on consecutive occurrences of a same type of step to create reduced state charts and encode an ordered sequence of steps from the reduced state charts into a blockchain smart contract,
        determine a current step of the multi-party process based on a comparison of a most recently-executed step from the blockchain and the ordered sequence of steps encoded within the blockchain smart contract,
        process the determined current step to generate a processed result, and
        store the generated processed result via the blockchain.

2. The computing system of claim 1, wherein the processor is configured to remove at least one receive event step from the plurality of state charts based on consecutive occurrences of the receive event step.

3. The computing system of claim 1, wherein the processor is configured to store a current execution state of an off-chain system that is included within the multi-party process.

4. The computing system of claim 1, wherein the processor is configured to store events which are sent and/or received by an off-chain system that occur via execution of the determined current step of the multi-party process.

5. The computing system of claim 1, wherein the processor is further configured to validate the blockchain result via a plurality of peer nodes.

6. The computing system of claim 1, wherein the multi-party process comprises a shared process performed by a plurality of off-chain systems and the blockchain.

7. The computing system of claim 1, wherein the processor is further configured to process a next executable step with respect to the determined current step of the multi-party process, via the blockchain, based on the generated processed result of the determined current step.

8. A method comprising:
    receiving a plurality of state charts of a plurality of participants of a multi-party process in which a blockchain is an intermediary between a plurality of off-chain systems;
    removing steps from the plurality of state charts based on consecutive occurrences of a same type of step to create reduced state charts and encoding an ordered sequence of steps from the reduced state charts into a blockchain smart contract;
    determining a current step of the multi-party process based on a comparison of a most recently-executed step and the ordered sequence of steps encoded within the blockchain smart contract;
    processing the determined current step to generate a processed result; and
    storing the generated processed result via the blockchain.

9. The method of claim 8, wherein the removing comprises removing at least one receive event step from the plurality of state charts based on consecutive occurrences of the receive event step.

10. The method of claim 8, wherein the storing of the identification of the processed step comprises storing a current execution state of an off-chain system that is included within the multi-party process.

11. The method of claim 8, wherein the storing of the identification of the processed step comprising storing events which are sent and/or received by an off-chain system during the execution of the determined current step of the multi-party process.

12. The method of claim 8, further comprising validating the blockchain result generated during the processing using a plurality of peer nodes.

13. The method of claim 8, wherein the multi-party process comprises a shared process performed by a plurality of off-chain systems and the blockchain.

14. The method of claim 8, further comprising processing a next executable step with respect to the determined current step of the multi-party process, via the blockchain, based on the generated processed result of the determined current step.

15. A non-transitory computer readable medium comprising instructions that when read by a processor cause the processor to perform a method comprising:

receiving a plurality of state charts of a plurality of participants of a multi-party process in which a blockchain is an intermediary between a plurality of off-chain systems;

removing steps from the plurality of state charts based on consecutive occurrences of a same type of step to create reduced state charts and encoding an ordered sequence of steps from the reduced state charts into a blockchain smart contract;

determining a current step of the multi-party process based on a comparison of a most recently-executed step from the blockchain and the ordered sequence of steps encoded within the blockchain smart contract;

processing the determined current step to generate a processed result; and storing the generated processed result via the blockchain.

16. The non-transitory computer readable medium of claim 15, wherein the removing comprises removing at least one receive event step from the plurality of state charts based on consecutive occurrences of the receive event step.

17. The non-transitory computer readable medium of claim 15, wherein the storing of the identification of the processed step comprises storing a current execution state of an off-chain system that is included within the multi-party process.

18. The non-transitory computer readable medium of claim 15, wherein the storing of the identification of the processed step comprising storing events which are sent and/or received by an off-chain system during the execution of the determined current step of the multi-party process.

* * * * *